US009886420B2

(12) United States Patent
Berger et al.

(10) Patent No.: US 9,886,420 B2
(45) Date of Patent: *Feb. 6, 2018

(54) SYSTEM AND METHOD FOR CREATING AND SHARING PHOTO STORIES

(71) Applicant: Shutterfly, Inc., Redwood City, CA (US)

(72) Inventors: Kelly Berger, Los Altos, CA (US); Adnan Asar, Los Altos, CA (US); Alessandro Isaacs, Mountain View, CA (US)

(73) Assignee: Shutterfly, Inc., Redwood City, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 14/679,652

(22) Filed: Apr. 6, 2015

(65) Prior Publication Data

US 2015/0212982 A1    Jul. 30, 2015

Related U.S. Application Data

(63) Continuation of application No. 14/132,909, filed on Dec. 18, 2013, now Pat. No. 9,014,489, which is a continuation of application No. 12/779,673, filed on May 13, 2010, now Pat. No. 8,655,111.

(51) Int. Cl.
| | |
|---|---|
| *G06K 9/62* | (2006.01) |
| *G06F 17/21* | (2006.01) |
| *G06F 17/30* | (2006.01) |
| *G06T 11/60* | (2006.01) |
| *G06K 9/00* | (2006.01) |
| *G06T 7/00* | (2017.01) |

(52) U.S. Cl.
CPC ...... *G06F 17/212* (2013.01); *G06F 17/30274* (2013.01); *G06K 9/00288* (2013.01); *G06K 9/00677* (2013.01); *G06K 9/00684* (2013.01); *G06T 7/97* (2017.01); *G06T 11/60* (2013.01)

(58) Field of Classification Search
None
See application file for complete search history.

(56) References Cited

U.S. PATENT DOCUMENTS

| | | |
|---|---|---|
| 5,974,401 A | 10/1999 | Enomoto |
| 6,017,157 A | 1/2000 | Garfinkle et al. |
| 6,064,397 A | 5/2000 | Herregods |
| 6,154,295 A | 11/2000 | Fredlund |

(Continued)

FOREIGN PATENT DOCUMENTS

| | | |
|---|---|---|
| EP | 0 975 147 A2 | 10/1999 |
| WO | WO 01/82231 | 11/2001 |

*Primary Examiner* — Nirav G Patel
(74) *Attorney, Agent, or Firm* — Xin Wen

(57) ABSTRACT

A system and method are described for creating, managing and sharing photo stories. For example, one embodiment of a computer implemented method for selecting among a plurality of different photo story templates comprises: receiving a plurality of new photos from a user the photos having metadata associated; analyzing the photos and the metadata associated with the photos; responsively grouping the photos into a plurality of different photo stories based on the analysis of the photos and the metadata associated with the photos; and selecting a set of photo story design templates for each of the different photo stories based on the analysis of the photos and the metadata associated with the photos grouped into the different photo stories.

20 Claims, 24 Drawing Sheets

(56) References Cited

U.S. PATENT DOCUMENTS

| | | | |
|---|---|---|---|
| 6,288,719 | B1 | 9/2001 | Squilla |
| 6,349,194 | B1 | 2/2002 | Nozaki |
| 6,362,900 | B1 | 3/2002 | Squilla |
| 6,388,732 | B1 | 5/2002 | William |
| 6,570,640 | B1 | 5/2003 | Garfinkle et al. |
| 6,667,814 | B1 | 12/2003 | Tiliotson |
| 6,727,909 | B1 | 4/2004 | Matsumura |
| 2002/0040375 | A1 | 4/2002 | Simon |
| 2003/0140315 | A1 | 7/2003 | Blumberg |
| 2004/0003342 | A1 | 1/2004 | Keane |
| 2004/0032599 | A1 | 2/2004 | Atkins |
| 2008/0089592 | A1 | 4/2008 | Isomura |
| 2008/0155422 | A1 | 6/2008 | Manico |
| 2011/0211736 | A1 | 9/2011 | Krupka |
| 2011/0296326 | A1 | 12/2011 | Reid |

Fig. 13

SYSTEM AND METHOD FOR CREATING AND SHARING PHOTO STORIES

PRIORITY PATENT APPLICATIONS

The present patent application is a continuation application of and claims priority to commonly assigned pending U.S. patent application Ser. No. 12/779,673, entitled "System and method for creating and sharing photo stories", filed May 13, 2010 by the same inventors, the disclosure of which is incorporated herein by reference.

FIELD OF THE INVENTION

This invention relates generally to the field of network data processing systems. More particularly, the invention relates to an improved architecture and method for generating photo stories.

BACKGROUND OF THE INVENTION

Current Web-based photo sharing systems allow end users to upload, share and print digital photographs over the Internet. These systems also allow the end user to combine groups of related photos into printable "Photo Books" with various cover options, designs and templates. Users may select among different Photo Book design "themes" including, for example, "Wedding" "New Baby," and "Holidays." Within each Photo Book theme, the user may further select among different "style" templates including different fonts, photo edges, page layouts, and colored backgrounds.

One limitation of current Photo Book systems, however, is that the user must manually select an appropriate Photo Book theme template and then manually select the photos and styles to be used for the selected template. This results in a significant amount of time wasted selecting options which, depending on the requirements of the end user, may ultimately be inappropriate. By way of example, the end user may manually choose a template which is suitable for displaying 1-5 photos whereas the user may ultimately need a template capable of displaying, for example, 10 or more photos. Similarly, the user may wish to use photos with different sizes and orientations, thereby rendering certain templates unusable. Additionally, current systems do not automatically select templates based on various types of metadata associated with the uploaded photos including, for example, the dates on which the uploaded photos were captured.

Consequently, what is needed is an improved system and method for creating and sharing groups of photos on the Internet and on printed products.

SUMMARY OF THE INVENTION

A system and method are described for creating, managing and sharing photo stories. For example, one embodiment of a computer implemented method for selecting among a plurality of different photo story templates comprises: receiving a plurality of new photos from a user the photos having metadata associated; analyzing the photos and the metadata associated with the photos; responsively grouping the photos into a plurality of different photo stories based on the analysis of the photos and the metadata associated with the photos; and selecting a set of photo story design templates for each of the different photo stories based on the analysis of the photos and the metadata associated with the photos grouped into the different photo stories.

BRIEF DESCRIPTION OF THE DRAWINGS

A better understanding of the present invention can be obtained from the following detailed description in conjunction with the following drawings, in which:

FIG. 10 illustrates a GUI for entering profile data for a user.

FIG. 12 illustrates a GUI for entering details for people within the photo stories database.

FIG. 13 illustrates one embodiment of a GUI for creating and/or editing a photo story template.

DETAILED DESCRIPTION OF THE INVENTION

Described below is a system and method for creating and sharing photo stories over the Internet. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

The assignee of the present application has developed an online stationery and greeting card system as described in the following co-pending patent applications, which are incorporated herein by reference:

SYSTEM AND METHOD FOR MANAGING CONTACTS AND CALENDARS WITHIN AN ONLINE CARD SYSTEM, Ser. No. 12/702,932, filed Feb. 9, 2010;

SYSTEM, METHOD AND GRAPHICAL USER INTERFACE FOR MANAGING CONTACTS AND CALENDARS WITHIN AN ONLINE CARD SYSTEM, Ser. No. 12/703,051, Feb. 9, 2010; and

SYSTEM, METHOD AND GRAPHICAL USER INTERFACE FOR MANAGING CONTACTS AND CAL-

ENDARS WITHIN AN ONLINE CARD SYSTEM, Ser. No. 12/703,130, Feb. 9, 2010.

Certain aspects of the systems described in these applications may be used for implementing an online photo service for creating, sharing and printing groups of photos, as described in detail below. As such, the system architecture described in the co-pending applications will first be described, following by a detailed description of a system and method for creating and sharing photo stories.

Embodiments Described in Co-Pending Applications

Figure 1:
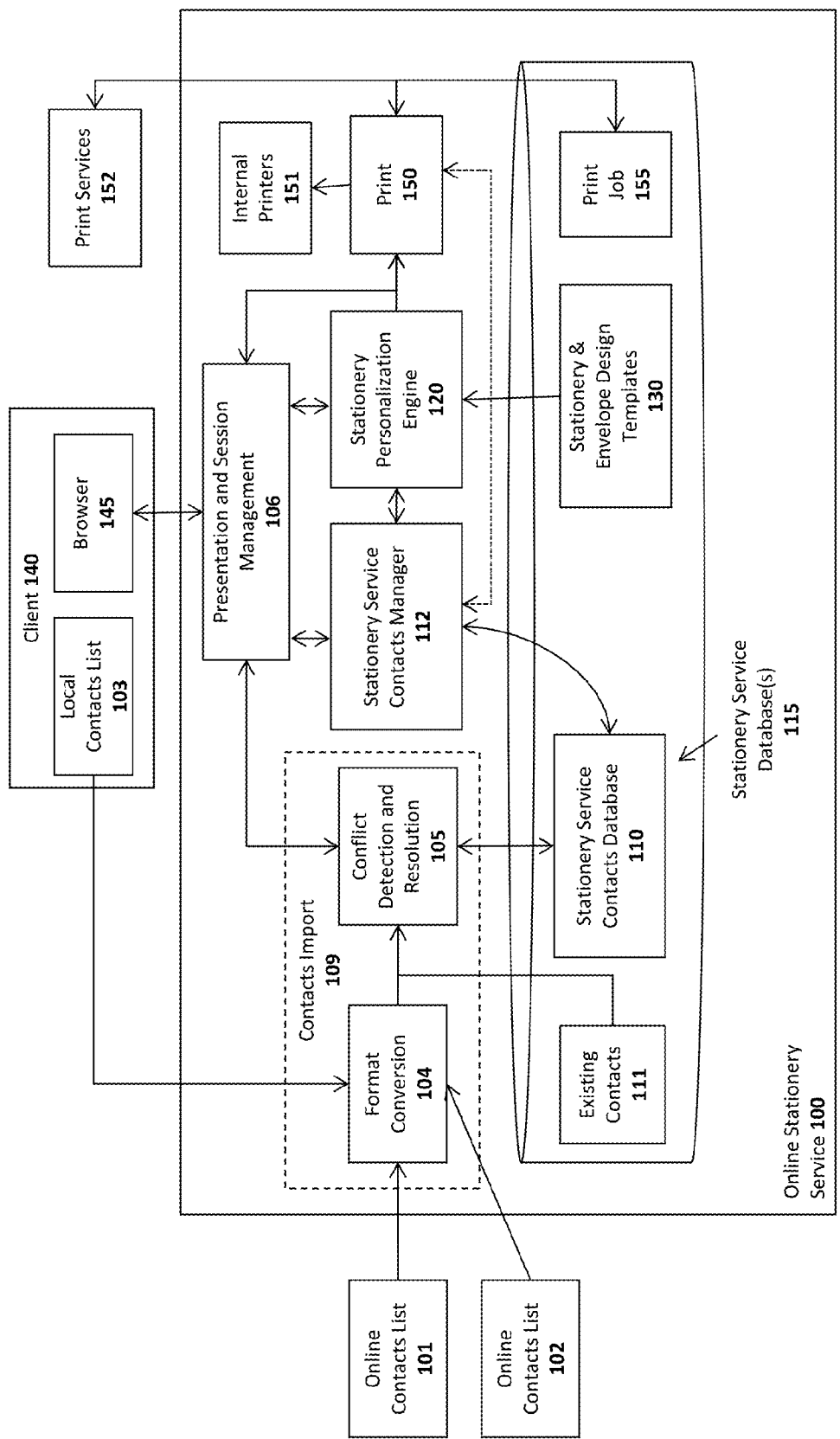
FIG. 1 illustrates a system architecture for an online photo service which includes a contacts database.
Figure 2:
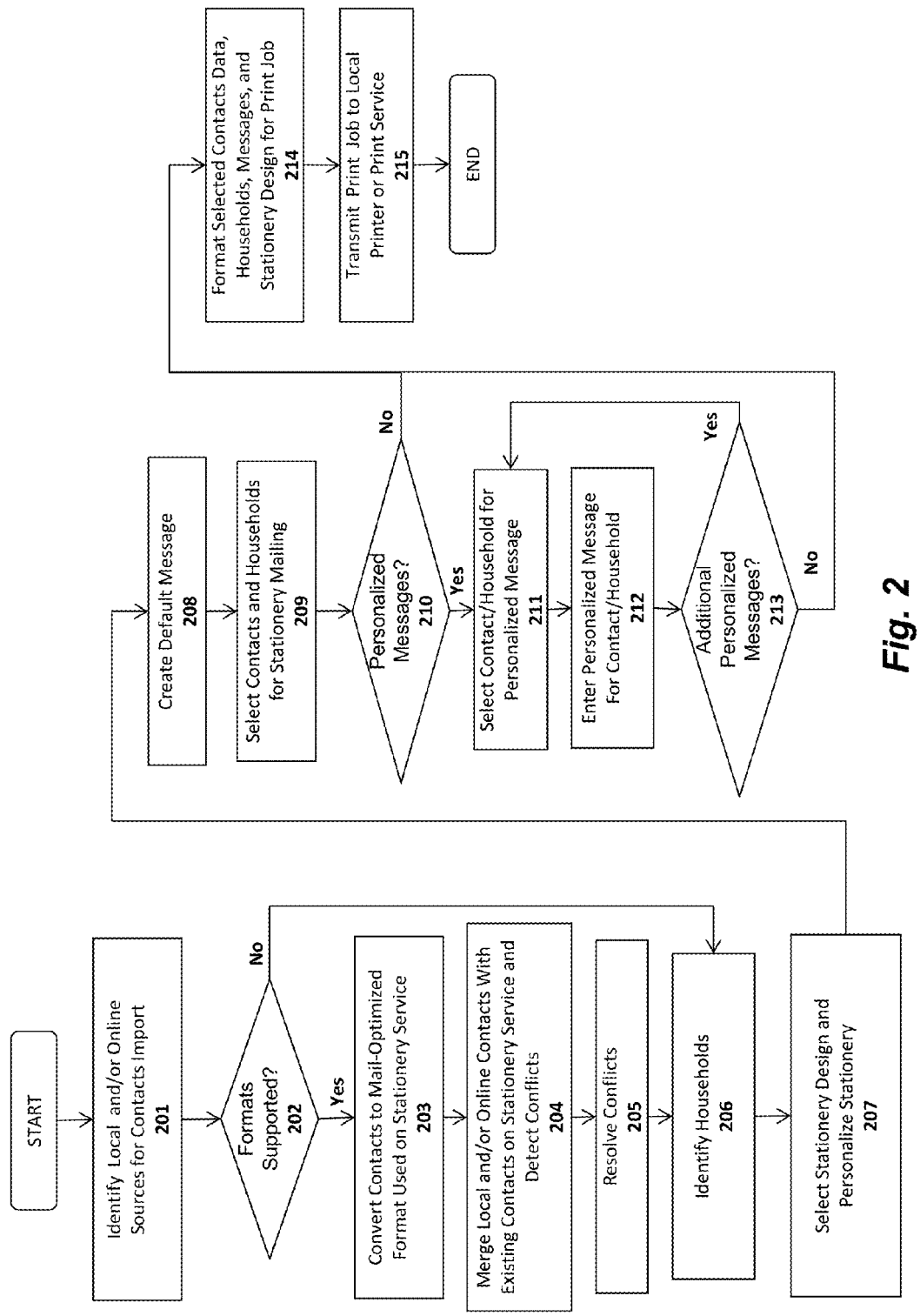
FIG. 2 illustrates a method according to one embodiment of the invention.

FIG. 1 illustrates one embodiment of a system architecture importing and managing contacts within an online stationery service 200 and FIG. 2 illustrates a corresponding method. One embodiment of the online stationery service 100 merges contact data from multiple different sources and then converts the contact data into a format which is optimized for online stationery mailing functions. A brief overview of the method illustrated in FIG. 2 will now be provided within the context of the architecture shown in FIG. 1. It should be noted, however, that the underlying principles of the invention are not limited to the specific architecture shown in FIG. 1.

At 201, a contacts import module 109 manages the importation of contacts from various local and/or online contact databases identified by the end user. In the illustrated embodiment, the contacts import module 109 comprises a format conversion module 104 and a conflict detection and resolution module 105. As shown in FIG. 1, the format conversion module 104 reads contacts data from online contacts databases 101-102; local contacts databases 103 (i.e., "local" to the user's client computer 140); and/or existing contacts 111 already stored on the online stationery service 100 (e.g., the end user may have already established an account on the online stationery service 100 to send stationery and may have entered information for a set of contacts 111). If the online/local contact formats are supported, determined at 202, then at 203, the format conversion module converts the contacts to a format optimized for use on an online stationery service 100. To perform the format conversion, the format conversion module 104 parses the contact data in source data structure (e.g., the CSV file, vCard file, etc), extracts the data, and assigns the data to appropriate data fields in the new data structure. Various well known techniques for converting data from one format to another may be employed by the format conversion module 104. Once converted (and following conflict detection described below), the contacts data is stored in its new format within a contacts database 110 on the stationery service. Various features associated with this new data format are described in detail below.

At 204, a conflict detection and resolution module 105 merges the local and/or online contacts with existing contacts 111 already stored on the online stationery service 100 and detects any conflicts which may result from the merge operation. A conflict may result if one or more contacts being imported are already stored within the existing contacts database 111. In such a case, the conflict detection and resolution module 105 resolves the conflicts at 205 using a set of conflict resolution rules (described below). Once all conflicts have been resolved, the data is persisted within the contacts database 110 and made accessible to end users via the stationery service contacts manager 112. In one embodiment, the contacts database 110 is implemented using mySQL. However, various different database formats may be employed while still complying with the underlying principles of the invention (e.g., Microsoft SQL, IBM SQL, etc).

At 207, the user identifies one or more "households" within the stationery service contacts database 110. As described below, households are specialized groups of contacts who live at the same address. The concept of a "household" is a particularly useful abstraction for an online stationery service 100 which mails stationery on behalf of a user.

As illustrated in FIG. 1, in one embodiment, all operations to the stationery service contacts database 110 occur through the stationery service contacts manager 112. That is, the stationery service contacts database 110 is used for persistent storage of contacts data containing the features described herein and the stationery service contacts manager 112 is the application-layer program code used to perform operations on the stationery service contacts database 110 as described below. The presentation and session management logic 106 comprises the program code for maintaining user sessions and for dynamically generating Web pages containing (among other things) the graphical user interface (GUI) features for manipulating contacts data as illustrated herein.

Returning to the method of FIG. 2, at 207, the user selects and personalizes a stationery design. In one embodiment, this is accomplished with a stationery personalization engine 120 such as that described in co-pending application entitled SYSTEM AND METHOD FOR DESIGNING AND GENERATING ONLINE STATIONERY, Ser. No. 12/188,721, filed Aug. 8, 2008, which is assigned to the assignee of the present application and which is incorporated herein by reference. In one embodiment, the stationery personalization engine 120 performs all of the functions described in the co-pending application as well as the additional functions described herein (e.g., selecting contacts/households for a stationery mailing via the stationery service contacts manager 112, selecting between a default message or a personal message for the contacts/households, etc).

At 208, the end user creates a default message to be used for a stationery mailing and, at 209, the contacts and/or households for the mailing are identified by the end user. If the user wishes to include a personalized message in lieu of the default message for one or more contacts/households, determined at 210, then the user selects a contact/household at 211 and enters the personalized message for the contact/household at 212. If any additional personalized messages are to be included, determined at 213, then steps 211 and 212 are repeated until all personalized messages have been entered.

At 214, all of the information related to the stationery order, including the selected stationery design, default messages, personalized messages and associated contacts and households are formatted for printing by a print module 150 which generates a print job 155. The formatting may include converting the stationery data mentioned above into a format usable by a particular printer. By way of example, a letter press printer may require different formatting than a digital press printer. In one embodiment, the specifications for the print job are encapsulated as metadata in an Extensible Markup Language ("XML") document and transmitted to an external print service 152. In one embodiment, the XML document includes a hyperlink (e.g., a URL) to the formatted print job 155 on the online stationery service 100. The print service 152 then accesses the print job by selecting the hyperlink. Regardless of how the print job is accessed, at 215, the formatted print job 155 is transmitted to either an internal printer 151 or an external print service 152 (e.g., over the Internet). Once printing is complete, the online stationery service 100 or the print service 152 mails the stationery to the contacts and/or households identified by the end user.

Having provided an overview of the method set forth in FIG. 2 and the architecture illustrated in FIG. 1, various specific details associated with managing contacts, generating print jobs and mailing stationery from an online stationery service 100 will now be provided. It should be noted, however, that the underlying principles of the invention are not limited to the particular architecture shown in FIG. 1 or the particular method set forth in FIG. 2.

Figure 3:
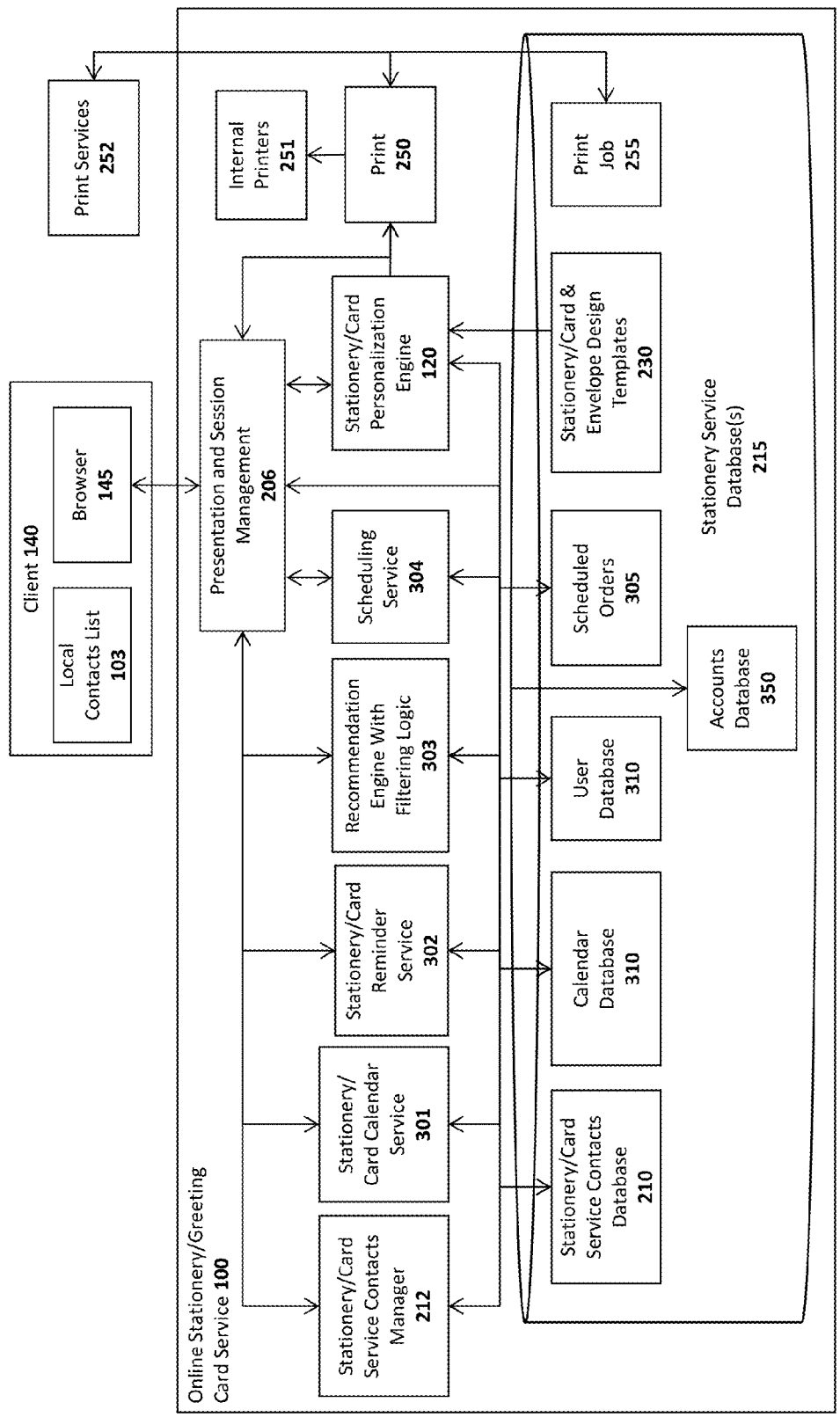
FIG. 3 illustrates a system architecture for an online photo service which includes a contacts database and a calendar database.

FIG. 3 illustrates one embodiment of a system architecture which integrates contacts and calendar data and includes additional modules for generating reminders, filtered recommendations, and for scheduling delivery of greeting cards/stationery. Specifically, in addition to the system components illustrated in FIG. 2, this embodiment includes a calendar service 301, a reminder service 302, a recommendation engine with filtering logic 303 and a scheduling service 304. The stationery/card service illustrated in FIG. 3 also includes a stationery service calendar database 310 for storing calendar data, a scheduled orders database 305 for storing order schedule data, a user database 310 for storing user data (e.g., user stationery/card preferences, configuration options, etc.), and an accounts database 350 for storing user account data. In one embodiment, the various databases shown in FIG. 3 are not actually separate databases but, rather, separate data structures (e.g., tables) within a relational database.

In one embodiment, the calendar database 310 stores calendar data for each user of the online stationery/greeting card service 200 and the calendar service 301 comprises executable program code for managing the calendar data (e.g., reading, adding, deleting, and modifying calendar entries). In one embodiment, the calendar service 301 also acts as an interface to the calendar data to other system modules 212, 302, 303, and 304 (e.g., by exposing a calendar data API).

The reminder service 302 generates graphical or audible reminders of upcoming calendar events and may prioritize the events based on a set of prioritization rules. In one embodiment, the calendar events are prioritized chronologically but some events are given relatively higher priority than other events based on the relationship between the user and the card/stationery recipients (e.g., the user's parents may be given a higher priority than the user's friends, notwithstanding the event dates). For example, an entry corresponding to Mother's Day may be prioritized at the top of the list even though other events (e.g., Labor Day) are nearer in time. In one embodiment, the highest prioritized event is either the next event created by the user (birthday, anniversary, other, etc) OR the next significant Holiday where "significant" holidays are identified in the online stationery/card system and may change over time. In one embodiment, the "significant" holidays are Mother's Day, Father's Day, and Christmas.

The recommendation engine with filtering logic 303 generates stationery/card recommendations to the end user based on the user's preferences and allows the user to filter the results according to user-specified filtering criteria. In one embodiment, the recommendations are categorized based on certain stationery/card characteristics and visually displayed to the end user in different categories (e.g., "new designs," "with pictures," etc). Moreover, in one embodiment, the recommendation engine 303 recommends stationery designs based on the preferences of the user and/or the preferences of the recipient (if known).

In one embodiment, the scheduling service 304 implements a scheduling algorithm to ensure that stationery/card orders are delivered within a specified delivery window and/or on a specific date. For example, the user may specify that a stationery/card order is to arrive 3-4 days prior to a recipient's birthday. In such a case, the user does not want the card to arrive to soon (e.g., 2 weeks prior to the birthday) or too late (after the birthday). To precisely schedule stationery/card orders, one embodiment of the scheduling service 304 evaluates the time required by the print services required to fulfill the order (e.g., thermography, digital press, etc.), the delivery type (e.g., regular mail, FedEx, etc), and the end user preferences.

In one embodiment, three data points are used to determine the delivery date: processing time, fulfillment time, and shipping transit time. The processing time may be based on the type of order. For example, processing time can be 0 days for greeting cards and several days for some stationery cards (e.g., those which require additional review by the online card/stationery service prior to fulfillment). The processing time is based on business days so it must factor in non-business days such as Holidays and Weekends to determine the number of calendar days required for processing. Fulfillment time is the number of days required to print, finish and ship/mail the order and is typically between 1-3 days (e.g., depending on the printing requirements). This time is based on business days for the fulfillment site which, in one embodiment, may be different than business days for the processing site. Shipping transit time is estimated based on the fulfillment site physical location and the shipping address of the recipient. The shipping transit time is based on business days for the shipping carrier and may be different than business days for the processing site and fulfillment site. In one embodiment, after computing the sum of the three data points, the system has the number of calendar days required for the order and determines the date that the order must be sent to the processing site in order to be delivered on the specified delivery date.

Presentation and session management logic 206 generates the Web-based graphical user interface (GUI) features described below, allowing the end user to view and edit the calendar data, contacts data, filtered card recommendations, and scheduling data. As illustrated in FIG. 3, the presentation and session management logic 206 communicates with each of the other functional modules and/or communicates directly with the stationery service databases 215 to retrieve the data needed for display within the GUI. Embodiments of the Web-based GUI features generated by the presentation and session management logic 206 are set forth below.

In one embodiment, each of the functional modules illustrated in FIG. 3 exposes an application programming interface (API) to provide access to data managed by that module. For example, the contacts manager 212 exposes an API allowing the calendar service 301 (and other modules) to access contacts data and vice versa. Alternatively, each of the functional modules may access the database(s) 215 directly.

In one embodiment, the calendar service 301 automatically generates calendar events based on the contacts data stored within the contacts database 210. By way of example, the calendar events may include birthdays, anniversaries, and other significant milestones associated with each of the contacts in the contacts database 210. In addition, the contacts manager 212 stores relationship data identifying the relationship between the user and each of the contacts in the user's contacts database 210 (e.g., identifying the user's spouse, siblings, parents, children, etc.). The calendar service 301 uses the relationship data to generate calendar events. For example, if the relationship data identifies the user's mother and father, then the calendar data may associate Mother's Day and Father's Day, respectively, with those contacts. Similarly, if the user is married with children the calendar service may associate his/her spouse with Mother's Day or Father's Day and/or the user's wedding anniversary.

Once calendar events are scheduled, in one embodiment, the reminder service 302 automatically generates reminders for upcoming events. For example, if a friend's birthday is approaching, then the reminder service 302 will notify the user a specified number of days/weeks ahead of time, so that the user has time to send a card. The specific timing of the reminder notifications may be specified by the end user and stored along with other user preferences within the user database 311.

In one embodiment, the reminders are generated and displayed within a Web-based GUI when the user logs in to the online stationery/card service 200 and/or may be sent to the user in the form of an email message or mobile text message. If sent in an email, links to the online stationery/card service website may be embedded within the message to encourage the user to design a new card.

In one embodiment, the recommendation engine 303 generates greeting card/stationery recommendations based on the occasion, the identity of the contact associated with the occasion, and the end user's preferences. For example, if a particular contact's birthday is approaching, the recommendation engine 303 may recommend certain greeting card styles (e.g., modern, classical, etc.) based on the contact's preferences and/or the user's preferences. The filtering logic allows the recommendations to be filtered based on specified variables (e.g., theme, color, card format, card size, number of photos, etc.).

Embodiments of a System and Method for Creating and Sharing Photo Stories

Figure 4:
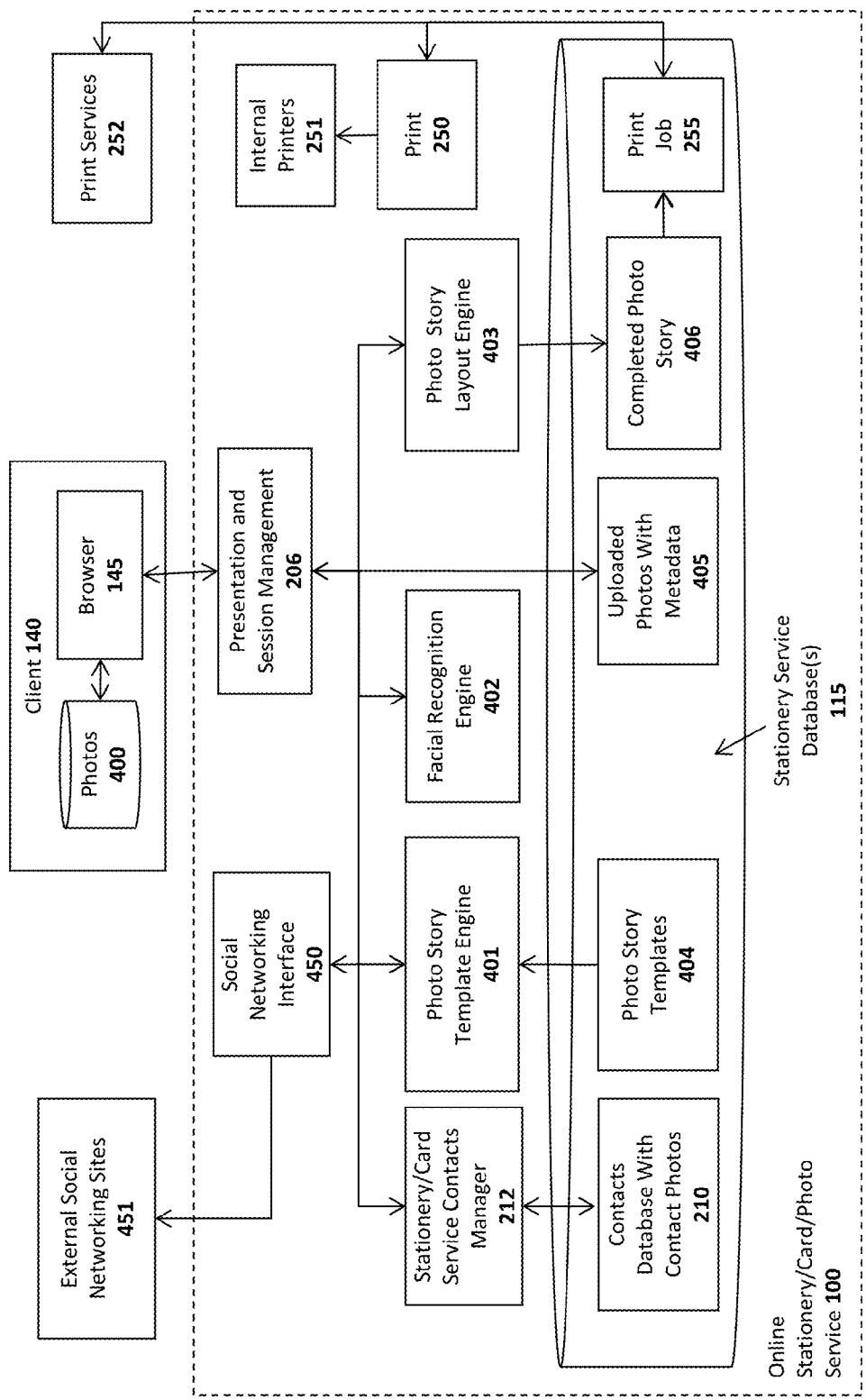
FIG. 4 illustrates one embodiment of the invention which automatically selects a photo story template and layout options for the photo story template.

FIG. 4 illustrates one embodiment of a system for creating and sharing photo stories. Some of the modules described above with respect to FIGS. 1 and 3 are not illustrated in FIG. 4 to avoid obscuring the underlying principles of the invention. However, the online stationery/card/photo service 100 (hereinafter simply "photo service 100") may implement all of these features concurrently on a single, integrated platform.

The illustrated embodiment includes a photo story template engine 401 for separating uploaded photos into a plurality of "photo stories" based on user input and metadata associated with each of the photos, and automatically selecting an appropriate photo story template for each photo story. The embodiment shown in FIG. 4 also illustrates a photo story layout engine 403 for determining an appropriate layout for each of the photos within each photo story template.

A face recognition engine 402 is included in one embodiment for analyzing pictures of people and generating facial "signatures" to uniquely identify the faces of those people. For example, in one embodiment, the face recognition engine 402 is executed on all of the photos in the user's contacts database 210, thereby generating facial signatures for all of the user's contacts and storing the results in the stationery service database 115. The facial signatures may then be used to identify the contacts in subsequent pictures uploaded by the user 405, as described below. Alternatively, the user may simply train the facial recognition engine 402 by uploading photos and identifying the individuals shown in each of the photos.

In operation, a user browses to a photo story creation Web page provided by the online photo service 100 and selects a group of photos 400 to be used to create one or more photo stories. Various well known techniques may be used for selecting the photos. For example, the web page may include a "browse" button which generates a window for browsing to a particular folder on the user's computer where the desired photos 400 are stored. The user may then highlight multiple photos (e.g., by holding down the SHIFT or CTRL keys while clicking the computer mouse) to select the photos. Alternatively, the user may "click and drag" one or more photos from a local folder on the user's computer to a designated region on the Web page to cause the photos to be uploaded. In one embodiment, a software application (e.g., designed by the online photo service 100) may be installed on the user's computer which automatically detects when new photos are imported from a photo source such as a digital camera and automatically uploads the photos to the online photo story service 100. In another embodiment, photos are imported from an online photo service such as Flickr, Picasa Web or SmugMug, which have public application programming interfaces (APIs) that allow other web sites to import photos from their servers. In another embodiment, software running directly on the photo capture device such as a digital camera or mobile phone automatically uploads new photos to the photo story service after they are taken.

As the photos are uploaded, they are stored within the stationery service database 115 (illustrated as Uploaded Photos With Metadata 405 in FIG. 4). Virtually all digital photos include some types of metadata, which is used by the various embodiments of the invention described herein. For example, a photo captured with a digital camera typically includes the date and the time of day that the photo was taken. In addition, some digital camera devices may also stamp the photo with a "Geotag" indicating the location where the photo was taken. The location may be determined, for example, using Global Positioning System (GPS) technology and stored with each photo. Moreover, some digital camera devices may be equipped with face recognition hardware/software for identifying individuals in the pictures (e.g., using the same techniques as those used by the facial recognition engine 402 on the photo service). Various other/additional metadata may be associated with each photo including, for example, the orientation of the photo (e.g., portrait, landscape), the photo size and the photo resolution, to name a few.

In addition to the metadata which is generated by the source of each photo (e.g., the digital camera), one embodiment of the invention generates additional metadata for each photo, either automatically (by analyzing the photo) or manually (by requesting information from the user). For example, as mentioned above, if the user has previously executed the facial recognition engine 402 and identified people in photos (e.g., from the pictures in the user's contacts database), then the face recognition engine 402 may automatically identify the people in each of the uploaded photos. Alternatively, the photo stories service could provide a user interface to select the names of the people that are in the photos from the stationery contacts database. In addition, the user may be prompted to enter information for each photo such as a set of keywords identifying the individuals or describing the scene and/or location presented in each photo.

Regardless of how the metadata is generated, it is stored for each photo within the set of uploaded photos 405 on the stationery service database 115. In one embodiment, the photo story template engine 401 uses the metadata to automatically separate the uploaded photos into different photo stories and to select appropriate templates for each photo story. Metadata variables which may be evaluated to separate the photos into different stories may include, but are not limited to, the date and time on which the photos were captured, the people identified in the photos, and/or the location at which the photos were taken. For example, one technique for separating photos into different photo stories is to generate a separate photo story for each date or date range. Alternatively, or in addition, if people are identified in each photo (either automatically by the face recognition engine 402 or manually by the user), the photo story template engine 401 may create separate photo stories for each identified person or group of people. For example, if the user's children are identified, then a photo story may be created using only photos of those children. Moreover, a story may be created for the location at which the photos were taken (e.g., at home, at work), or using any combination of date/time, identity of subject, and/or the location of the set of photos.

In one embodiment, the default operation of the photo story template engine 401 is to generate a different photo story for each date or time range. However, the user may specify that photo stories should be grouped using different criteria such as the identity of specific individuals (e.g., particular members of the user's immediate family, specific friends, etc) or that date, time and identity may be used to create the photo stories.

Regardless of how the photos are divided between photo stories, the photo story template engine 401 then suggests photo story template designs for each photo story based on the attributes of the photo story. The goal is to suggest a design that best suits the story and automatically arrange the pictures in the design template to reduce the work required by the end user. One embodiment of the template selection algorithm initially filters out templates that are not well suited for the story and then calculates a specific weighting score on each attribute for each photo story template to create a ranking score for each template. The templates are then sorted by rank and the top ranked template is used to display the photo story as shown in FIG. 7C. The remaining ranked templates are made available to the end user in a graphical user interface (GUI) (see, e.g., FIGS. 7A-8) to allow the user to browse through the recommended designs. In particular, in one embodiment, the photo story template engine selects appropriate templates for each story according to one or more of the following metadata variables:

Date Taken—The date of the story is used to determine the season or time of year that it occurred. Each photo story template can include a season attribute defined as a period starting from a specific day and month to an ending day and month. For example, a template could be designed for winter which starts December 1 and continues until March 1. If the photo story date is between those days of the year, the template will be assigned the "season" score. As another example, a template could be designed for a holiday such as Christmas on December 25. If the story date is December 25, season score will be applied to the template.

Number of Photos—The template has an attribute for number of photos defined as a range from 1 to 100. If the number of photos in the story is not within the range specified in the template, the template is filtered out as not applicable for the story. In addition, a "preferred" range of photos may be specified (e.g., 2-5) for each photo story template. If the number of photos in the story falls within the preferred range, then a relatively higher weight may be applied to the prospective template.

Orientation of the Photo—If a photo is used as the story canvas background, the orientation of the photo could impact the design. A template can include an orientation attribute with one of the values of Landscape, Portrait or Square. This attribute is used to filter out templates that do not apply. For example, if the photo is landscape orientation, all templates that have the orientation attribute set to Portrait or Square and have the photo as background will be filtered out.

Title and Description—The title and description are optional information that the user can enter for a photo story. If the story includes either of these two attributes, any template that does not include them will be filtered out. The template can also display the date taken and the age of people in the photo story. If the story includes these attributes and the template includes the attribute, the template is assigned the score for date taken or age, respectively.

Occasion—The design template can include an occasion attribute such as Birthday or Anniversary. If a person in the story has a birthday on the story date and the template has the birthday occasion attribute set, the template is assigned the Birthday score. Similarly, if a person in the story has their wedding anniversary on the story date, the template is assigned the Anniversary score.

Template Tags—A template can include keyword tags that describe the design. If the story title or description entered by the end user contains any of the tags in the template, the template is assigned the title tag or description tag score. In one embodiment, the title is weighted higher than the description because the title entered by the user is more important in describing the story.

People Tags—A person defined in a user profile (and possibly stored within the contacts database) can include keyword tags that describe their personality or interests. If the person tags match any of the tags in the template, the template is assigned the people tag score. For example, if a person loves dolls, the user can add a "dolls" tag and a template with dolls will be suggested by the recommendation system.

People's Favorite Colors—A favorite color may be specified for a person defined in a user profile and/or contacts database. If the person identified in a story has a favorite color that matches a color in the template, the template is assigned the favorite color score.

Location—A template can have a location, region, and/or point of interest attribute that defines the geographic area and/or the specific location for which the design is best suited. In one embodiment, a region is defined as a city, state, or group of states. If the location of the photo story is known (either as part of the photo meta data or manually entered by the user) and the template has the same location or region, the template is assigned the location or region score/weight. For example, a template could be designed for the Monterey Bay Aquarium with sea creatures and logos from the aquarium. If a story has the location set to the Monterey Bay Aquarium, the template is assigned the location score. As another example, if a photo was taken in New York City and a template is set with New York City as the region, then the template is assigned the region score.

Design Style—A template can include a design style attribute such as "Artistic," "Classic," "Vintage," "Whimsy" or "Contemporary." A user profile or contact entry within the user's contacts database can include a design style attribute either selected by the user or based on past photo story usage and orders. If the design style attribute for the user matches the design style attribute of the template, the template is assigned the style score.

Mood—The mood of the photo story can also reflect on the design template. By way of example, mood options may include "Angry," "Happy," "Relaxed," and "Sad." As with other variables, the preferences of the user and/or people identified in the photos may be determined to select a mood.

Relationships—A template can include relationships that define the personal relationships for which the design is best suited. The user profile can include a contacts database with people and their relationship to the user (e.g., son, daughter, wife, mother, father, etc). Consequently, when people are identified in photos, the photo stories will include attributes associated with the people in the story, which then associates the story to relationships. If the story includes people with relationships that match the relationships set on the photo story template, then the template is assigned the relationship score. The template can also include a relationship group such as "My Family" or "Couple". If a relationship group is set on the template, it will be filtered out if the story does not include the exact relationships. For example, for the "My Family" relationship group, the story must include the relationship defined in the user profile as "my family." The "Couple" relationship group may be defined as husband and wife.

In one embodiment, the following weights are applied to attributes by the photo story template engine 401. The attributes are weighted by importance when determining the "best matches" for the photo story with higher values meaning higher importance:

Season Score=10
Location Score=50
Region Score=10
Relationship Score=50
Birthday Score=200
Anniversary Score=100
Description Tag Score=10
Title Tag Score=25
People Tag Score=20
Style Score=10
Mood Score=10

It should be noted, however, that the underlying principles of the invention are not limited to any particular set of attribute weights.

In one embodiment, the photo story template engine 401 scans through all of a user's photos 405 (or an identified subset of the user's photos) to create new stories based on requirements specified by the user. For example, the user may specify that a story is to be created using photos of the user's children. In response, the photo story template engine 401 will identify all photos of the user's children (e.g., using the metadata discussed above) and generate photo stories using these photos. Similarly, the user may specify that the photo story template engine 401 should generate a photo story for the holiday season for a particular year, for example, by specifying a date range such as Dec. 24, 2009 to Jan. 1, 2010. The photo story template engine 401 then generates stories using pictures from within the specified date ranges. One embodiment of the service will provide the user with pre-configured options for certain holidays (e.g., "Thanksgiving '09 Photo Story"). Because each photo has metadata associated with it, virtually any user query directed to the metadata may be applied to identify a subset of photos and generate a photo story based on the query results. Of course, the underlying principles of the invention are not limited to any particular type of metadata or query.

In one embodiment, after a set of prospective photo story templates are selected and ranked by the photo story template engine, the photo story layout engine 403 automatically generates an exemplary photo story layout using the selected photo story templates, photos, and text associated with each photo story. In one embodiment, each photo story template includes photo areas and text boxes based on relative dimensions and coordinates within the canvas of the photo story design template. The photos in the story are arranged within the photo areas and the size and coordinates of each photo area are dynamically adjusted by the photo story layout engine based on the number and size of the photos.

In one embodiment, each photo area within a photo story design template includes an attribute for a minimum and maximum number of photos and the size and position of the photo area is determined based on the number and size of the photos in the story. One embodiment of the photo story layout engine 403 uses the following attributes to arrange the photos within a photo template:

zIndex—The design elements (e.g., photo areas, text boxes, graphics) are layered on the canvas based on the zIndex with larger values representing higher layer in the z-plane.

Layout Order—For normal layout flow, the design elements are positioned based on the layout order starting from top-left and going to bottom-right.

Float—Each design element may be assigned a float attribute to float left or right on the canvas.

Position Coordinates—The design elements may have values for left, top, right and bottom defined as percentages of the width or height of the canvas.

Sort Order—The photo areas have a sort order attribute that defines the order that photos are arranged in the photo areas.

Maximum Photos—This attribute defines the maximum number of photos that a particular photo area can contain.

Dimensions—The design element has a size defined as width and height as a percentage of the width and height of the canvas.

Effects—A photo area can include effects including rotate, feather and color conversion (black and white, sepia). The specified effects are applied to any photos within the designated photo area (e.g., every photo is feathered by a specified percentage).

Border—A photo area can include a border attribute to add a border with width, padding and color to each of the photos within that photo area.

Photo Sizing—This attribute defines how the photos in the photo area will be cropped to fit within the photo area with options including best-fit, uniform width and uniform height.

Photo Alignment—This attribute defines how the photos are aligned and distributed within the photo area. Values are align-left, align-center, align-right, align-top, align-middle, align-bottom, distribute-horizontally and distribute-vertically.

Text Attributes—Text boxes have attributes for font, color, size, leading, alignment, and no-wrap. If the no-wrap attribute is set, the text size is reduced to make the text fit within the text box without wrapping to the next line.

Text Variables—Text boxes can include text variables that will be assigned values from the photo story information. These variables include Title, Date Taken, Location, Description, Family Name, Member Name, Member Home Address, People Names, People Ages, Birthday Age, and Anniversary Years.

The photos within a photo area are arranged based on an algorithm using the photo area attributes described above. The dimensions of the photo area are first determined based on the size of the template and dimensions attributes set on the photo area and the number and size of the photos in the photo area. For example, if the minWidth and maxWidth are both 100%, minHeight is 10% and maxHeight is 30%, and there are three photos in the photo area, the photo area width is set to the width of the template canvas and the height is determined by the height of the photos.

Figure 5A:
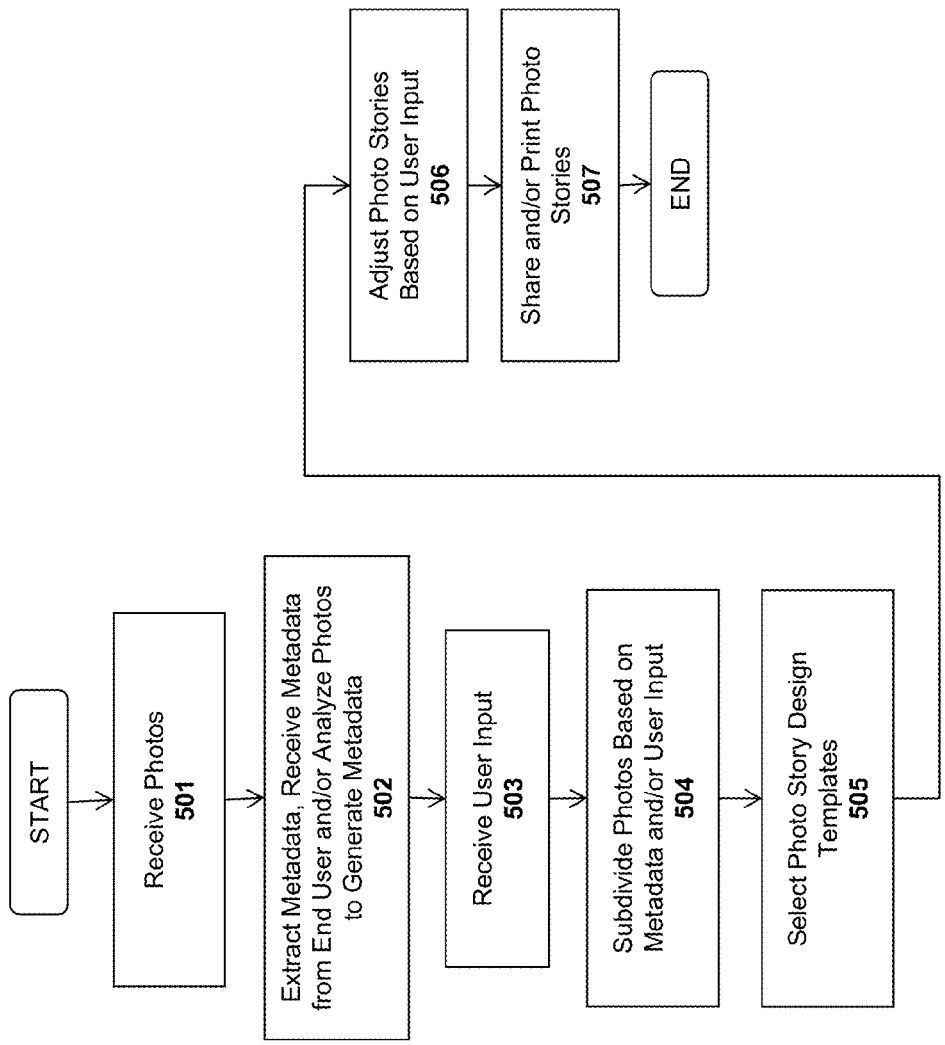
FIGS. 5A-5B illustrate a method for automatically selecting a photo story template.

FIG. 5A illustrates a method for generating and sharing photo stories in accordance with one embodiment of the invention. At 501, new photos are received. For example, the end user may select a new set of photos to upload to the online photo service 100. At 502, metadata is extracted from the photos, manually entered by the end user and/or generated automatically by the photo service 100. For example, the date/time may be read from each of the photos, the user may manually enter a description of the content of the photos, and/or the photo service may automatically analyze the photos to generate metadata (e.g., extracting colors from the photos or using the facial recognition engine 402).

At 503, user input is received to filter and/or arrange the photos based on specified criteria. For example, the user may specify that a particular photo story is to be focused on a particular subject (e.g., the user's children) during a particular day (e.g., Halloween). The user may also adjust the time range to group more or less photos together. At 504, the photo story template engine automatically separates the photos into photo stories based on the collected metadata and/or user input. At 506, the user may adjust the photo stories by, for example, removing photos, adding photos and/or filtering out certain photos (e.g., using metadata as the filtering criteria). At 507, when the photo stories have been completed, the user shares and/or prints the photo stories 507.

In one embodiment, the user is provided with the option of specifying one or more social networking sites through which the photo stories may be automatically shared (e.g., Facebook, Twitter, etc). Once the user's authentication data for these social networking sites has been entered and stored on the photo service 100 (e.g., the user's ID code and password), a social networking interface 450 can automatically connect to one or more external social networking sites 451 on behalf of the end user to upload the new photo stories. Thus, in one embodiment, at the end of the photo story creation process, a "Share Photo Stories" hyperlink is provided on the photo stories Web page to provide this functionality. In response to the user selecting the "Share Photo Stories" link, the social networking interface 450 will then automatically connect to the external social networking sites 451 with the user's authentication data and upload the new photo stories to the social networking sites 451. As is known in the art, social networking sites such as Facebook expose a Web services API to allow these types of transactions.

In addition to the "Share Photo Stories" link, in one embodiment, a "Print Photo Stories" link is provided. In response to selecting the "Print Photo Stories" link, the completed photo story 406 is sent as a new print job 255 and printed by an internal printer 251 or using an external print service. In one embodiment, the user may specify a group of individuals to always receive printouts of new photo stories (e.g., the user's parents, grandparents, siblings, etc). The online photos service 100 maintains the identity of these individuals (e.g., within the contacts database 210) so that they can be readily identified in response to the user selecting "Print Photo Stories."

Figure 5B:
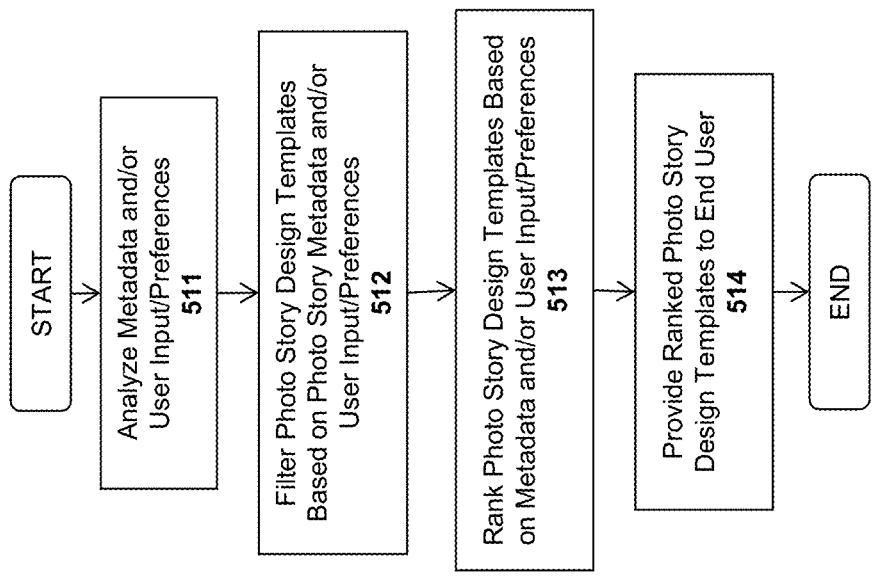

FIG. 5B provides additional details associated with how the photo story template engine selects a set of photo story templates (step 505 in FIG. 5A). At 511, the photo story template engine analyzes the metadata and/or user input to separate the photos into photo story groups. In a simple embodiment, the photos are separated into photo story groups based on the date/time that the photos were taken. Alternatively, or in addition, other variables such as the identity of the photo subjects may be used to group the photos.

At 512 photo story design templates are filtered based on the photo story metadata and/or user preferences. As mentioned above, any of the variables associated with the photo story such as the number of photos, the orientation of the photos, the existence of a title/description, etc, may be used to filter out unsuitable photo story design templates from consideration. For example, if the number of photos in the photo story is not within the range specified in the template, the template is filtered out as not applicable for the photo story.

At 513, the existing photo story design templates are ranked based on the metadata and/or user input/preferences. As mentioned above, each photo story design template is assigned a weight based on certain variables. If those variables are detected in the group of photo story photos, then the weight is applied to the design template. For example, if a particular set of photos fall within a specified date range, then the season score of 10 may be applied to all photo design templates associated with that season. Similarly, if the photos are associated with a particular location, then the location score of 50 may be applied to all photo story design templates associated with that location. When all applicable weights have been applied, the weights are added to arrive at a "score" for each prospective photo story design template. Finally, at 514, the photo story design templates are provided to the end user based on the calculated rankings. In one embodiment, the photo story design template having the highest ranking is selected and populated with photos by the photo story layout engine 403. The user may then have the option to peruse the other photo story design templates. Upon selection of each design template, the photo story layout engine 403 will automatically populate the design template with photos (e.g., using the layout techniques described herein).

In addition, in one embodiment, the photo story layout engine 403 extracts the main colors from the story photos which are used to automatically color certain design elements within the photo story design template. This results in a layout and design that complements the photos without overpowering the photos. One embodiment of the design coloring algorithm uses the colors from the photos in the story and replaces the colors in certain specified design elements with these colors. The colors are extracted by using image processing functions to reduce the number of colors to the 16 most dominant colors in the image, known as color quantization. This results in colors that the human eye perceives across the image as a whole instead of the extreme peaks in the colors. The photo colors are stored as RGB (red, green, blue) values with a usage value that is set equal to the number of pixels within the quantized image that are that color. The 16 colors for a photo story are determined by performing a union of the colors from all of the photos in the story and then sorting by the usage values to arrive at the 16 most used colors. The design elements such as overlay frames and design accents (embellishments) are then colored by replacing specific colors with one or more of the most used colors from the photographs. The colors to be replaced are determined by extracting the colors from the overlay image (such as a PNG image or PDF vector graphics file). The template designer selects which colors should be replaced with colors from the photographs. This is shown in the overlay form in FIG. 14. For example, the colors shown in 1407 are the colors (defined as RGB hex values) that the designer has selected to be replaced.

Figure 6A:
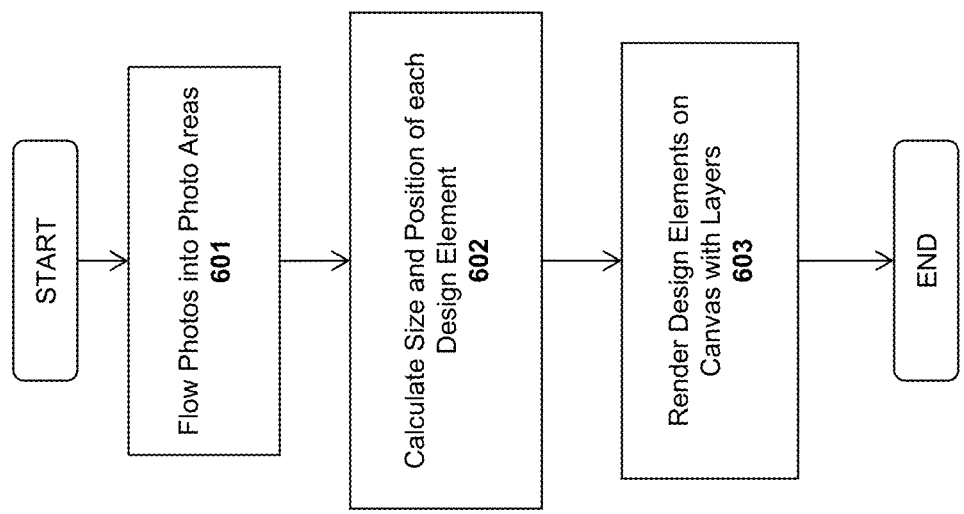
FIGS. 6A-6B illustrate methods for laying out photos and text regions within a photo story template and for selecting colors for design elements.

FIG. 6A illustrates one embodiment of an algorithm for automatically laying out the design elements based on the text and photos in the photo story. The system gets the list of design elements from the photo story templates database 404 and process them in two passes. At 601, the photos are flowed into the photo areas using the Sort Order and Maximum Photos attributes set on each photo area. At 602, the first pass through the design elements is used to determine the width and height and position of each design element on the canvas. The width and height of text boxes are determined by the Width and Height set on each text box. The width and height of each photo area are based on the attributes set on the photo areas and the size and number of the photos in the photo story. For each photo area, the maximum and minimum aspect ratios are determined based on the aspect ratios (width/height) of the photos in the photo area. In all cases, either the width or the height of the photo area is set and only one of the dimensions is adjusted based on the photos in the photo story. If the width is set, the height is determined by the Photo Sizing attribute. If this attribute is set to Uniform Width, the width of each photo within the photo area is calculated based on the number of photos (photo area width/number of photos). The height of the photo area is determined by the maximum aspect ratio of all the photos (height=width/aspect ratio). After determining the width and height of each design element, the position of each element is determined by the Position attribute set on each design element. If the Position attribute is set to NormalFlow, the element is positioned to the right and below the element above it in the flow. In one embodiment, the same (or similar) layout algorithm as used in Cascading Style Sheets (CSS) is employed (i.e., for positioning used in many web browsers when laying out the web page contents). A similar technique may be used for other values of the Photo Sizing and Position attributes. At 603, the second pass through the design elements completes the layout of the elements on the canvas in layers based on the zIndex attribute of each element.

Figure 6B:
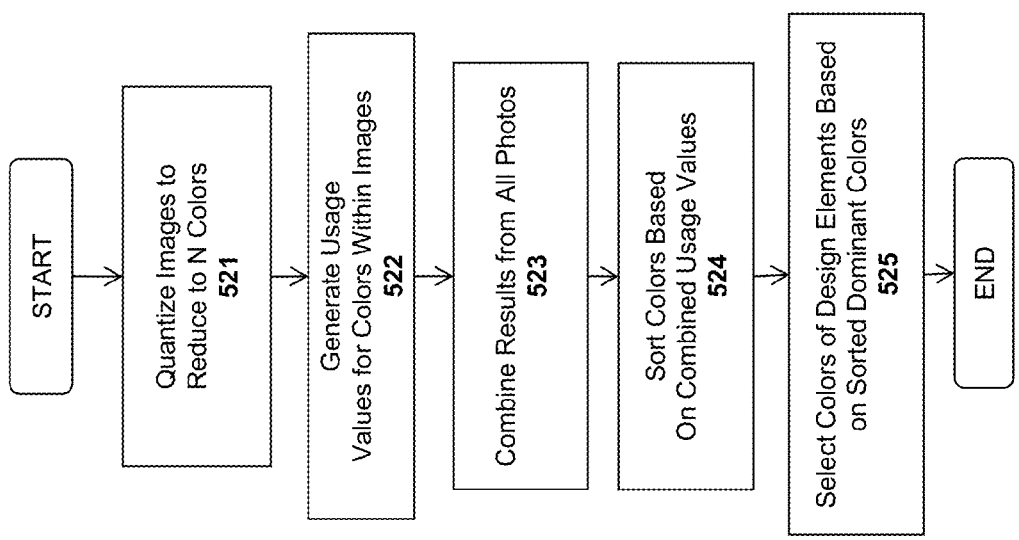

FIG. 6B illustrates one embodiment of an algorithm for selecting colors for design elements based on the main detected colors within the story photos. At 521, each of the images within the photo story is quantized to reduce the image to a specified number N of colors. In one embodiment N=16; however, the underlying principles of the invention are not limited to any particular number of quantized colors. At 522, usage values are generated for each color by (in one embodiment) adding the number of pixels within the quantized image that are each color. At 523, the results from each of the photos are combined to arrive at usage values for the photo story. At 524 the colors are sorted based on usage values and, at 525, colors of one or more design elements are selected based on the sorted usage values. For example, the design elements such as overlay frames and design accents (embellishments) may be colored by replacing specific colors with one or more of the most used colors from the photographs. The colors to be replaced are determined by extracting the colors from the overlay image (such as a PNG image or PDF vector graphics file).

Figure 7A:
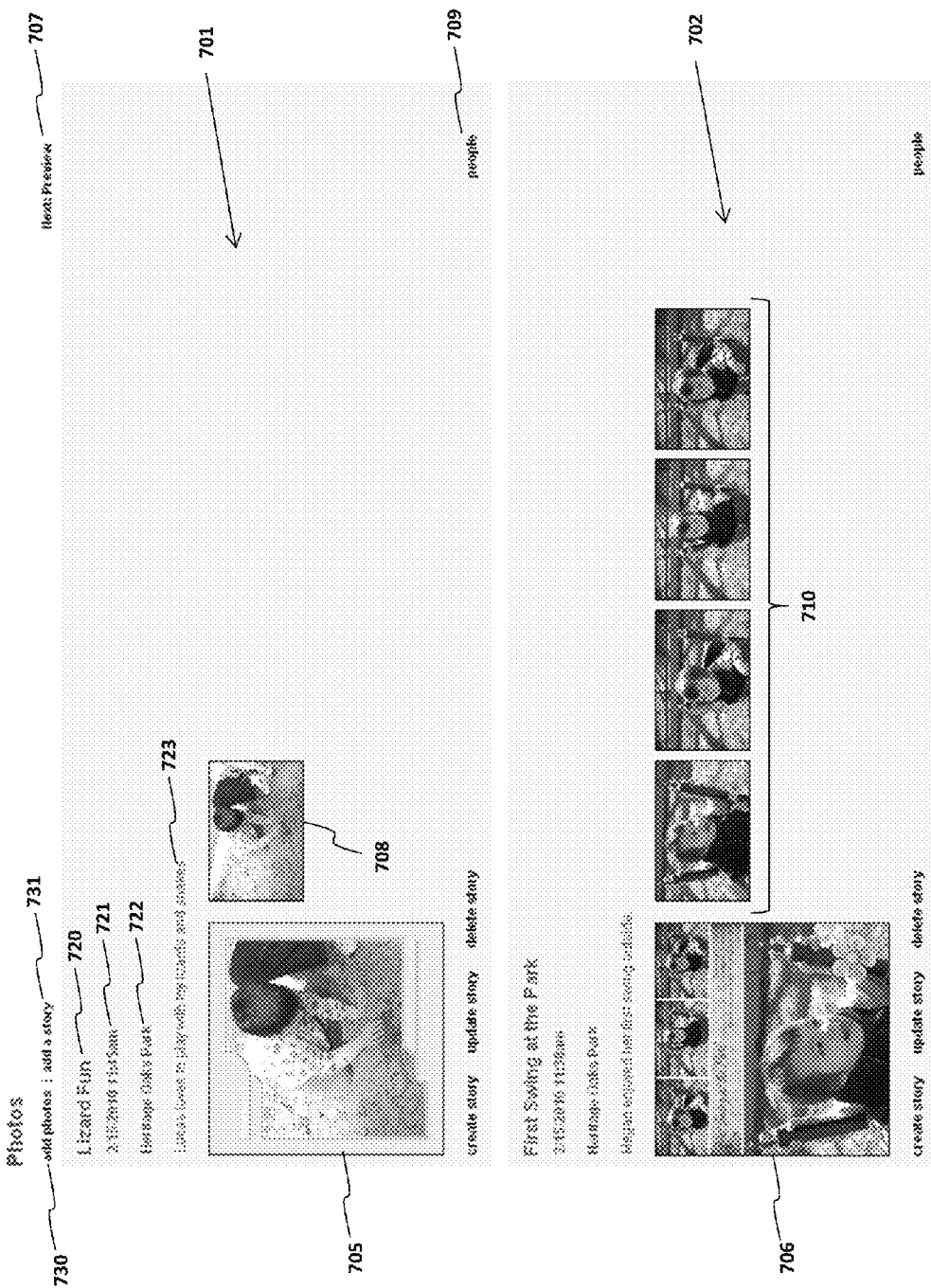
FIGS. 7A-9C illustrate embodiments of graphical user interface (GUI) for creating and managing photo stories.
Figure 7B:
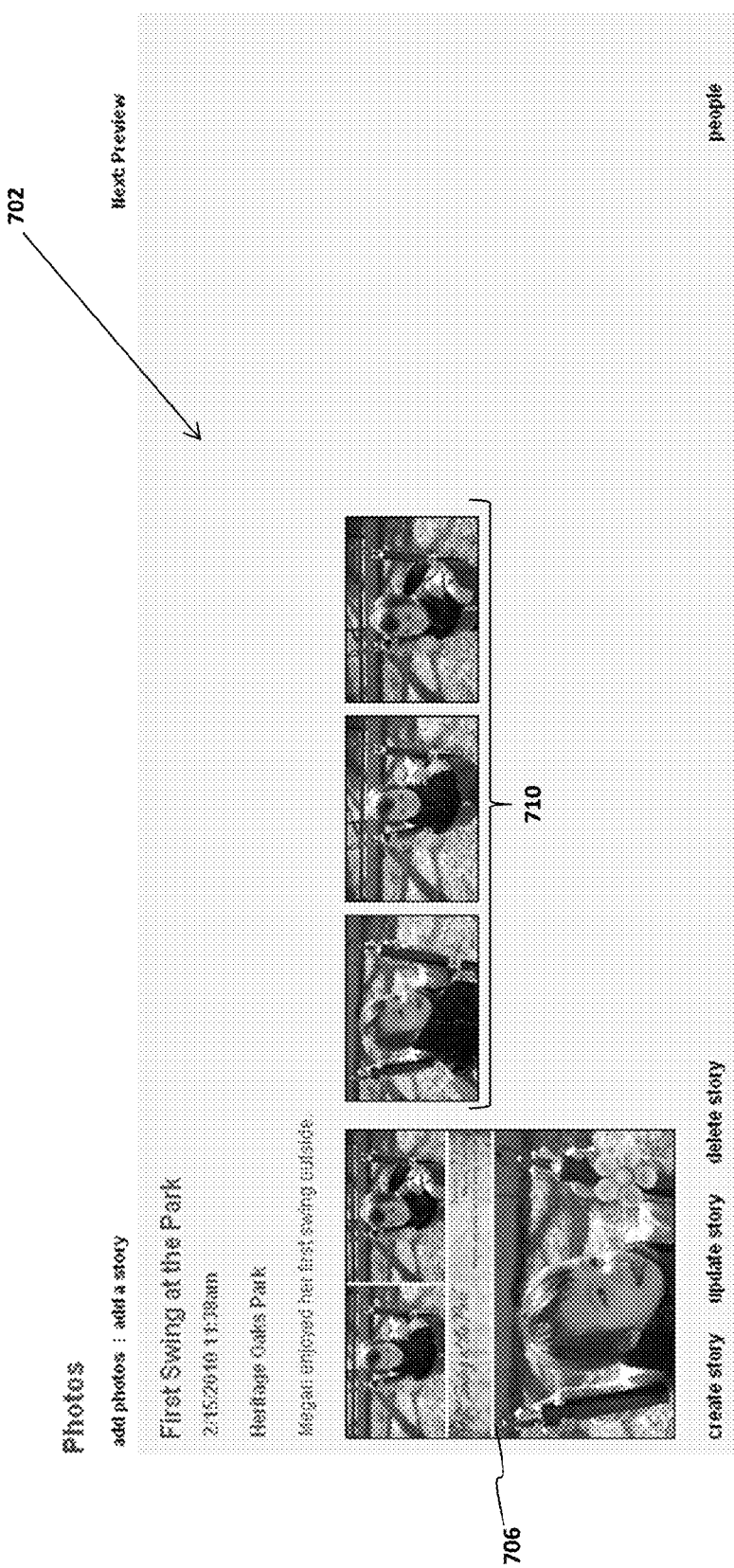
Figure 7C:
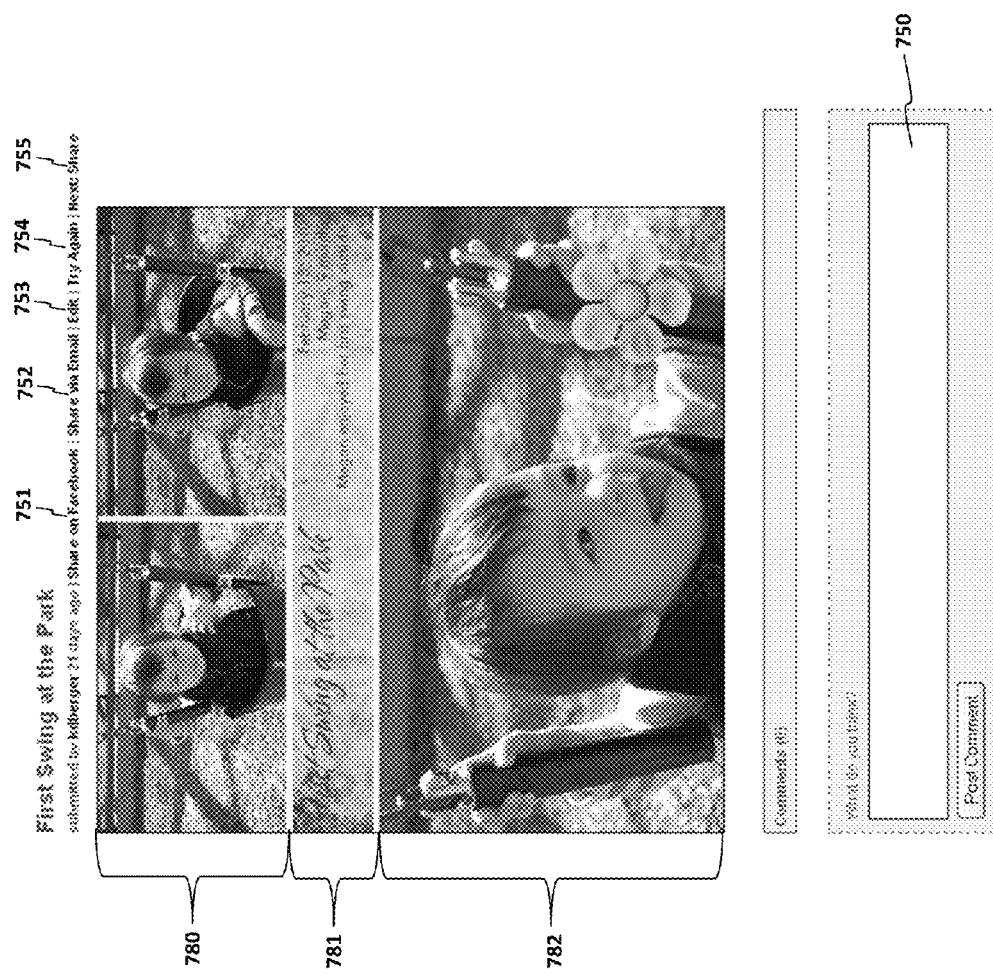

One embodiment of a graphical user interface ("GUI") for viewing and manipulating photo stories created by the photo story template engine 401 and photo story layout engine 403 is illustrated in FIGS. 7A-C and FIG. 8. Each photo story is provided with its own region 701, 702, 801 in which the user can modify the photo story in various ways and ultimately share the photo story with other users. As mentioned above, in one embodiment, the photos are separated into the different photo stories by the photo story template engine 401 (e.g., based on metadata such as date/time, photo subject, location, etc). A preview image for each photo story is initially displayed with photos integrated within the highest-ranked design template selected by the photo story template engine 401. In FIGS. 7A-B, this includes photo story preview images 705 and 706 and in FIG. 8, photo story preview image 805. The photos selected for use in each photo story are also displayed within their respective photo story regions. For example, a single photo 708 is displayed within photo story region 701; four photos 710 are displayed within photo story region 702; and four photos 810 are displayed within photo story region 802.

New stories may be added via an "add a story" link 731 and photos may be added via an "add photos" link 730. In one embodiment, photos may be moved between photo story regions 701-702, 801 by clicking and dragging the photos with a mouse or other cursor control device. Moreover, new photos may be added to the photo story regions by selecting them from a folder on the user's computer system and copying/pasting or clicking and dragging them to the photo region. When a new photo is moved to the photo region, the same analysis as described above may be employed (e.g., to identify the individuals within the photos).

In addition, in one embodiment, photos may be rearranged within the photo story previews 705-706, 805 by modifying the order of the photos within a photo story region. For example, to change the large photo at the bottom of the photo story preview 706 shown in region 702, the user may click and drag the leftmost photo within the group towards the right, thereby causing the order of the photos to be rearranged within the photo story preview 706. Said another way, the order of the photos within the photo story corresponds to the order of the photos within the photo region 702.

Within each photo story region, a data entry field 720 is provided for entering a photo story title; a date/time field 721 is provided for the date/time during which the photos were taken; a location field 722 is provided to indicate the location at which the photos were taken; and a description field 723 is provided, allowing the user to enter a description for the photo story. In one embodiment, some of the fields, such as the date/time field 721 are automatically entered by the photo story template engine 401 while other fields are entered manually by the user. In one embodiment, before the user has entered any data to these fields, the title field 720 reads "untitled;" the location field 722 reads "add a location" and the description field 723 reads "add a description."

When a user changes the number of photos within a photo story (e.g., by adding or deleting from one of the photo regions 701, 702, 801), the photo story template engine 401 may re-rank the photo story design templates based on the change and/or the photo story layout engine 403 may adjust the layout of the photos within the current photo story design template. In FIG. 7B, a photo has been removed from photo story region 702, thereby changing the number of photos from 4 to 3. In response, the photo story layout engine 403 automatically rearranges the photos within the photo story design template 706, as shown.

FIG. 7C illustrates the stationery design template 706 in greater detail. This particular photo story design template includes two photo regions, 780 and 782, and one text region 781. The first photo region 780 is configured to hold from 1-4 photos and the second photo region 782 is configured to hold a single photo. Thus, in one embodiment, the photo story layout engine 403 sizes the photo within the second photo region 782 to be the same width as the photo design template (minus the size of the border if one is used). To do so, it may crop the photo vertically and/or horizontally to generate the best fit based on the vertical size constraints specified in the photo story design template for this photo region. In one embodiment, if the photo story layout engine 403 scales a photo it keeps the horizontal and vertical scaling proportional (to ensure that the image is not visually compressed horizontally or vertically). Similarly, the photo story layout engine may adjust the size of the text region 781 based on the size of the photos used in the two photo regions and the text region constraints specified within the photo story design template. With respect to the first photo region 780, the width of the photo story design is split evenly between each of the photos. Thus, because the horizontal and vertical scaling must remain consistent, the first region is shallower in the vertical orientation with three photos than with two (as shown by a comparison of the design template 706 of FIGS. 7A and 7B).

In one embodiment, a link is provided within each photo region 701, 702, 801 to allow the user to toggle through each of the ranked photo story design templates. In response, the photo story layout engine 403 will automatically layout the photos and text within each selected photo story design template.

In one embodiment, selecting the "Next: Preview" link 707 shown in FIG. 7A generates a finalized preview of the photo story 705 such as that shown in FIG. 7C and may also provide options for viewing other photo story templates. As illustrated in FIG. 7C, the preview Web page may include links 751 and 752 to share the photo story on a social networking site or via email, respectively. An edit link 753 allows the user to edit any of the photo or text boxes within the photo story template (e.g., providing features such as resizing, moving, cropping, etc) within the size/coordinate constraints set by the photo story design template. A "try again" link 754 toggles between different photo story design templates. Finally, a share link 755 provides a plurality of different options for sharing the photo story design template (e.g., different social networking sites, different email addresses, different print options, etc.) such as those shown in FIG. 7E (described below). In one embodiment, if the current photo story is not the last to be reviewed in succession, then the share link 755 is simply a "next" link, allowing the user to move to the next photo story preview.

In one embodiment, the text used within text regions of the photo story templates may include variables which are adjusted based on the subject in the photo. For example, if the subject has been identified and the birthdate of the subject is known (e.g., from the contacts database), then the age of the subject may be generated as text on the front of the photo story template. For example, in FIG. 7C, the subject has been identified ("Megan") and the age of the subject has been calculated as of the date that the photos within the photo story design template were taken ("9 months" in the example). The use of variables within text boxes is described in detail in the co-pending applications such as SYSTEM AND METHOD FOR DESIGNING AND GENERATING ONLINE STATIONERY, Ser. No. 12/188,721, filed Aug. 8, 2008, referenced above.

Figure 7D:

FIG. 7D illustrates one embodiment of a photo story GUI in which two sets of photos have been separated into two different photo story groups 730, 731. In this example, the photos groups have not yet been assigned photo story templates. At this stage, the user may opt to delete photos from each of the groups 730-731 and/or manually add photos to the groups. Each of the photo groups are provided with a title 740, a date/time 741, a location 742 and a description 743. As mentioned above, some of this information may be determined automatically (e.g., using metadata such as time/date) and all of this information is editable by the user. Once the user has edited the photos and the information related to the photos, selecting a "create story" link causes the photo story template engine 401 to select an appropriate template and the photo story layout engine 403 to layout the photos within the template (as described above). The template then appears with the photos within the photo story region (e.g., as shown in FIG. 7A-C). An update story link 745 causes the photo story to be updated with newly added photos, deleted photos, new photo arrangements, and/or new information entered by the user. A delete story link 746 deletes the photo story.

Figure 7E:

FIG. 7E illustrates a "share and print" GUI which provides a set of user-selectable options 751-756 for sharing and/or printing photo stories. In one embodiment, this GUI is generated in response to the user selecting the share link 755 shown in FIG. 7C. The photo stories to be shared are displayed within a photo story region 750 and links to skip sharing/printing 760 and to share/print 759 are provided. The options for sharing/printing may have been pre-specified by the end user and, in FIG. 7E, include well known websites such as Facebook 751, Twitter 752, Picasa 753, and Flickr 754. In addition, the options may include email 755 (for emailing copies of the photo stories) and prints 756 (for printing paper copies of the photo stories). In one embodiment, the recipients to receive the email and prints have been specified by the user and stored in the user's personal data on the online stationery service.

Figure 8:
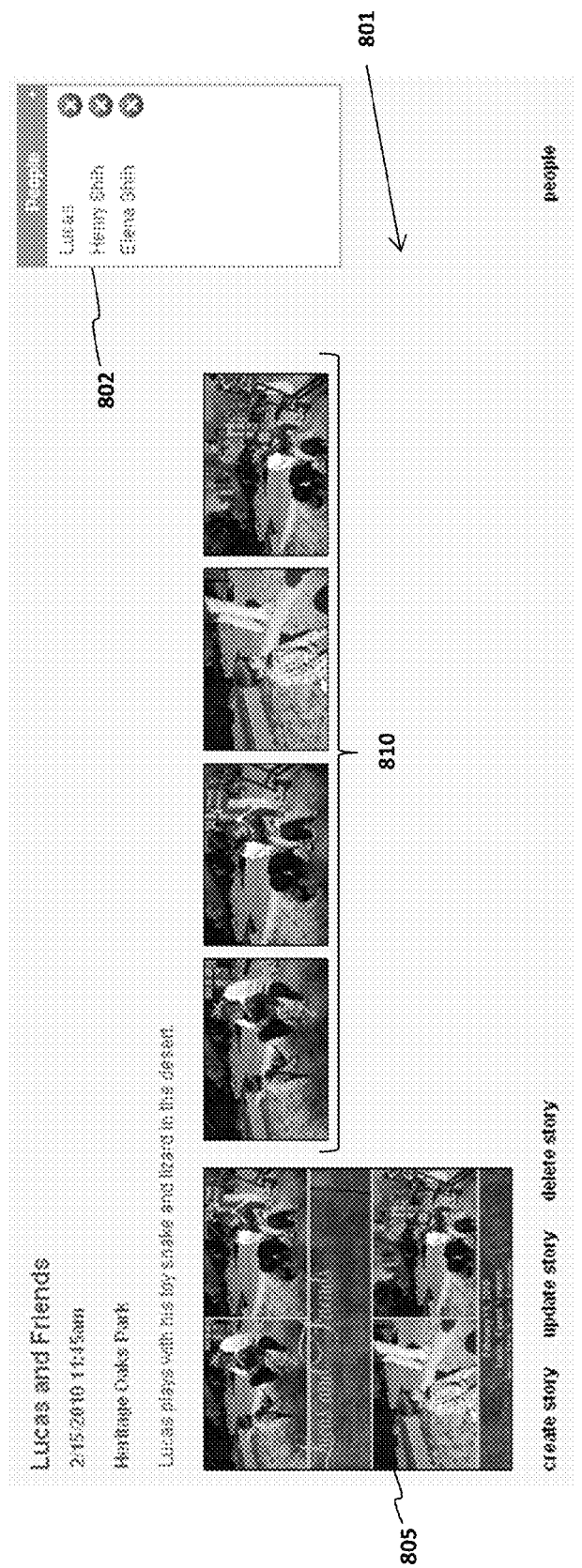

As shown in FIG. 8, in one embodiment, a listing of people 802 may be generated within a photo story region to show who is pictured in the photo story. The listing 802 may be generated, for example, in response to the user selecting the "people" link in FIG. 7A. A graphic is provided next to the name of each person in the list which, when selected, removes that person from the list and removes any photos including that person from the photo story region 802.

Figure 9A:
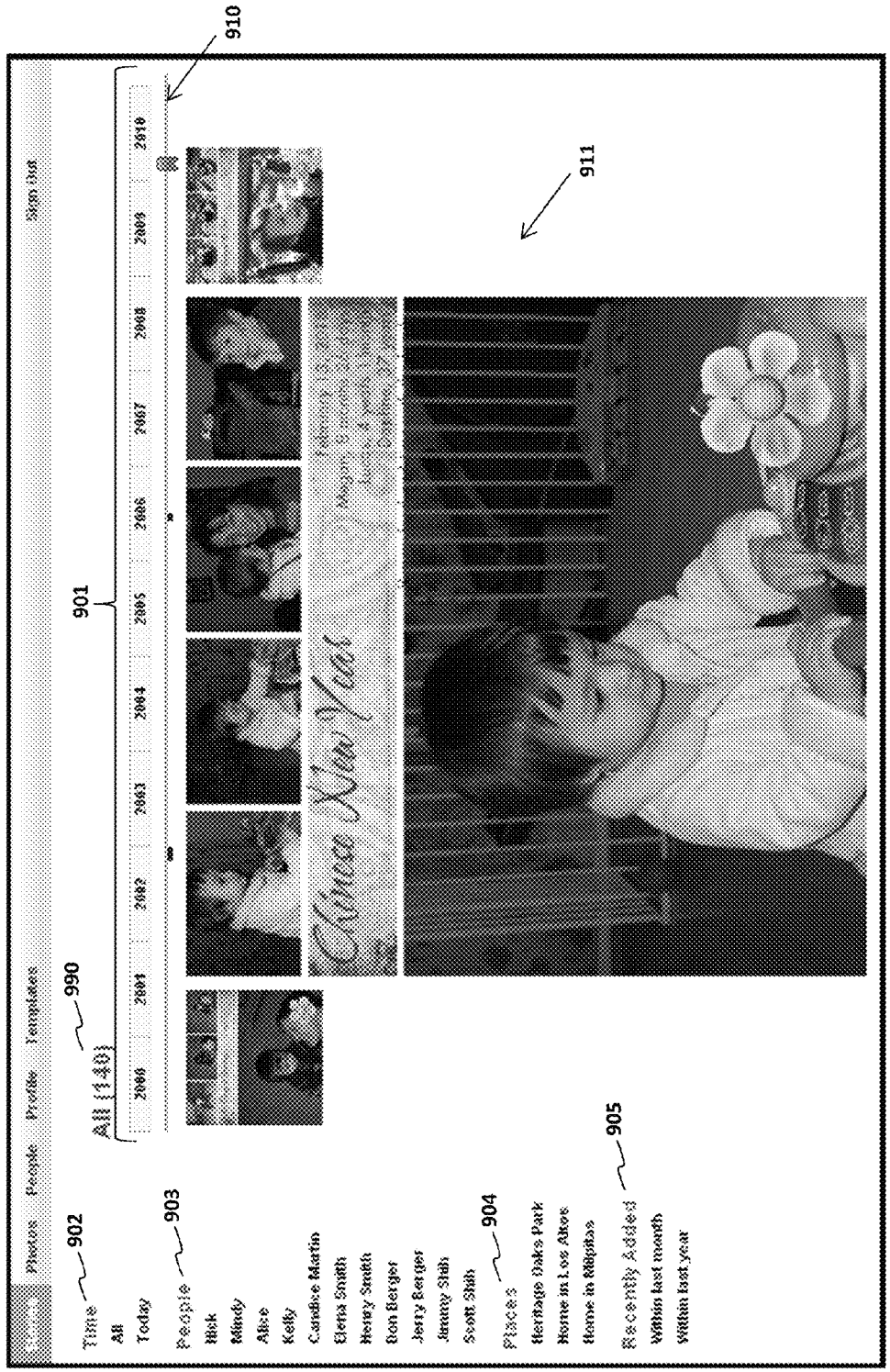

FIG. 9A illustrates one embodiment of a graphical user interface for managing and browsing existing photo stories (e.g., in response to selecting a "My Photo Stories" link). Particular groups of photo stories are displayed within a photo stories region 911 based on selections made by the user within a set of filtering options 901-905. For example, a graphical timeline 901 is provided at the top of the GUI. Upon selection of a particular date or date range (e.g., month, year) within the timeline, photos occurring during that date range are displayed within the stories region 911. A scroll graphic 910 is also provided allowing the user to scroll through the timeline, thereby causing new sets of photo stories to be displayed as the scroll graphic is scrolled.

Figure 9B:
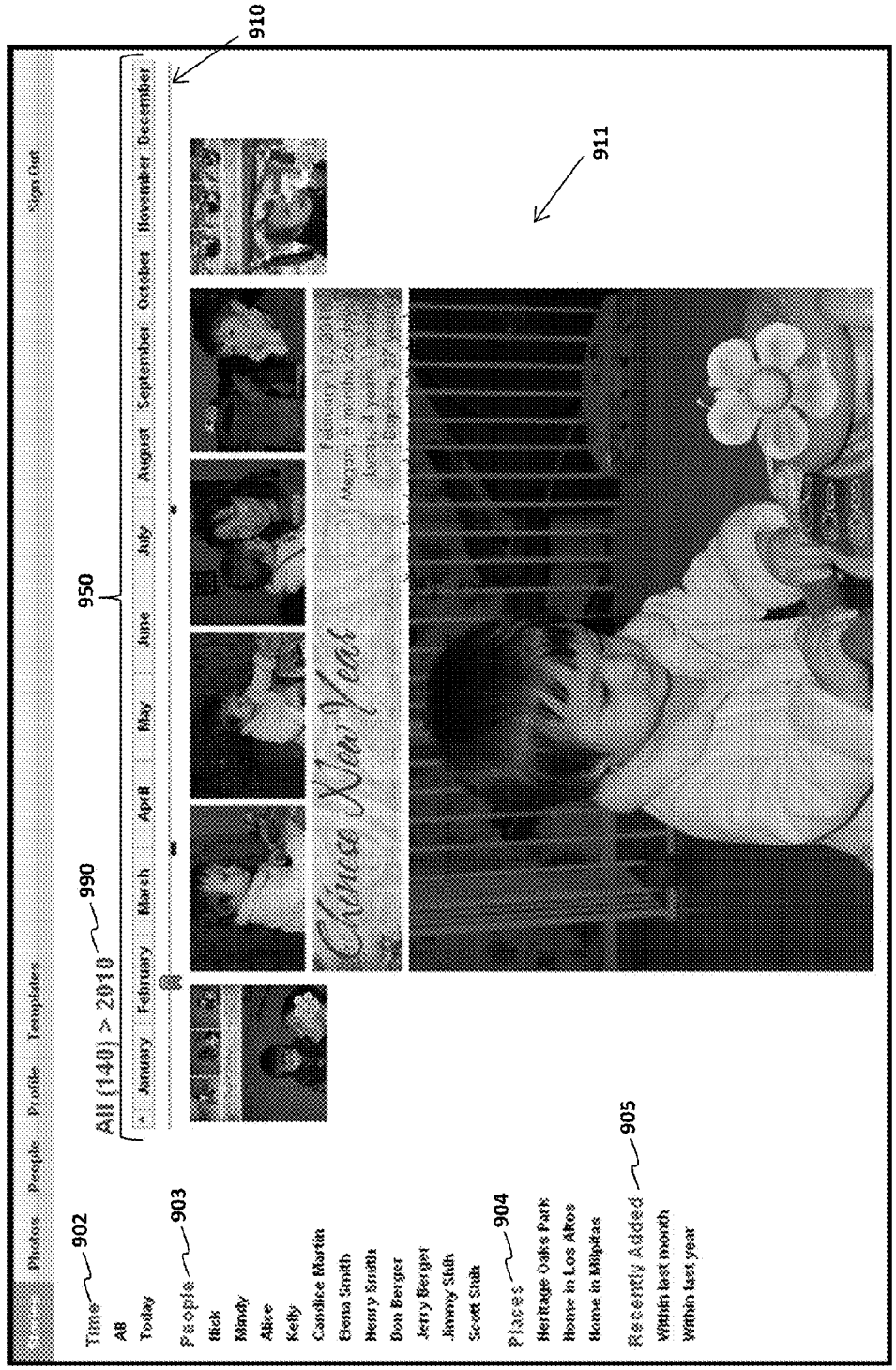
Figure 9C:
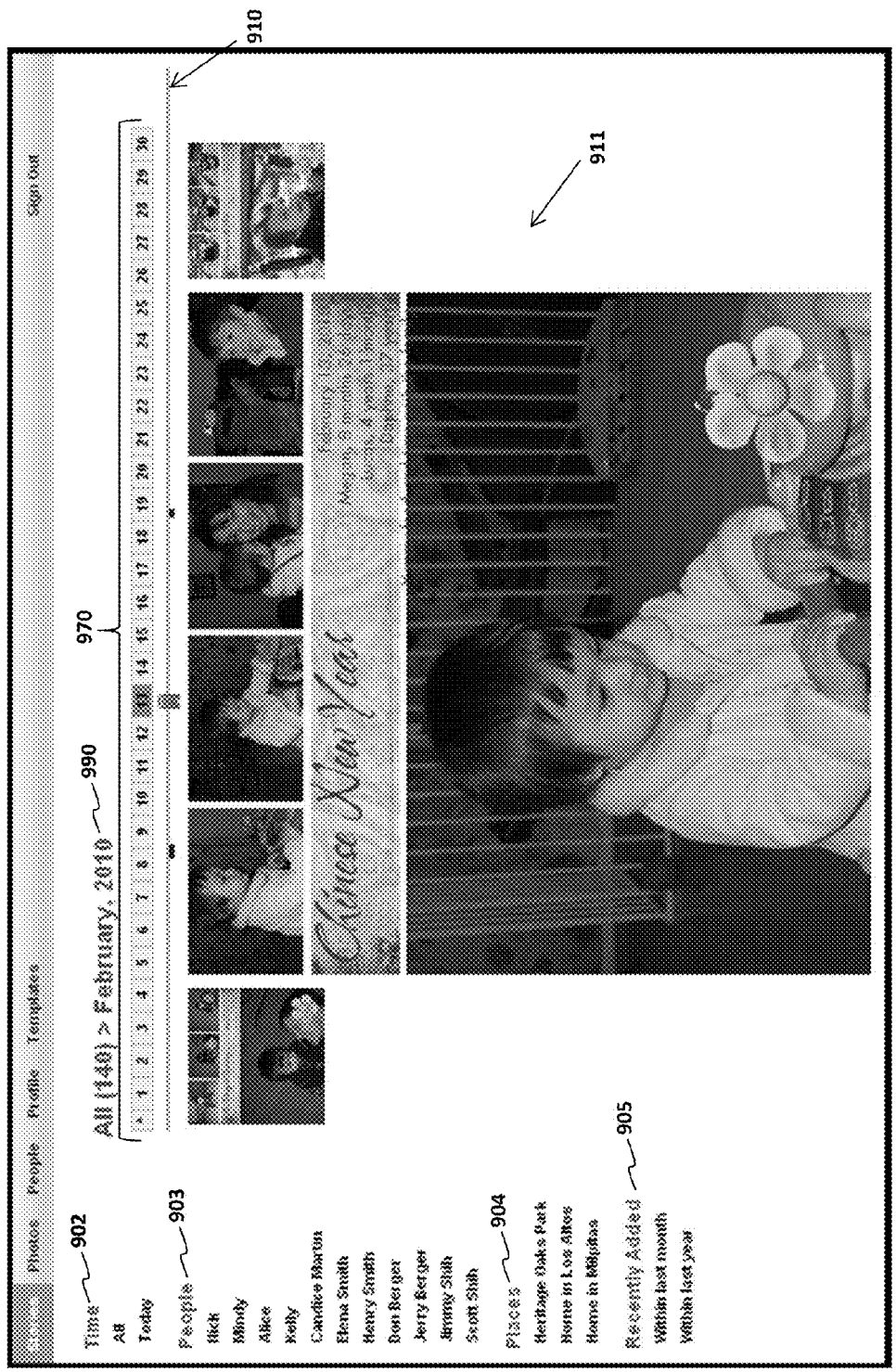

In one embodiment, the initial browsing window provides a timeline 901 having a relatively low level of precision. For example, in FIG. 9A, the timeline includes a plurality of entries corresponding to a plurality of years (2000-2010). In one embodiment, selecting a particular year from the timeline 901 filters the photo stories displayed within the display region 911 (i.e., showing only photo stories having photos captured during that year). As shown in FIG. 9B, in response to user selection of a particular year, a new timeline 950 may be generated having a relatively higher level of precision, i.e., months in the illustrated embodiment. Moving the scroll graphic 910 across the various months in the timeline causes pictures from each month to be displayed. In one embodiment, selecting a particular month from the timeline 950 displays photos from that month as shown in FIG. 9C, and generates a new timeline 970 having an even higher level of precision, i.e., days of the month in the illustrated embodiment. Selecting one of the days of the month causes photo stories having photos from that day to be displayed within the display region 911. In one embodiment, days, months, and/or years for which no photos exist are greyed out within the GUIs shown in FIGS. 9A-C. In addition, in one embodiment, links 990 are provided at the top of the GUI to allow the user to jump to the timelines at different levels of precision.

A separate set of filtering options is provided to the left including options for filtering photo stories based on the time 902, options for showing photo stories involving specific people 903, specific places 904 and recently added photo stories 905. As filtering options are selected at the left, an indication of the filtering appears within the heading of the GUI (e.g., "All (128)" is shown in the example in FIG. 9A). In one embodiment, filtering options may be combined. For example, the user may select two different individuals under "people." In response, the photo story GUI will only display photo stories having both of the selected people as subjects (i.e., the people are ANDed together). In addition, in one embodiment, once a particular person is selected, a list of selectable tags are generated allowing the user to browse through all of the stories that the selected person is in by selecting the different tags (e.g., birthday, hat, cars, park, etc).

Figure 10:
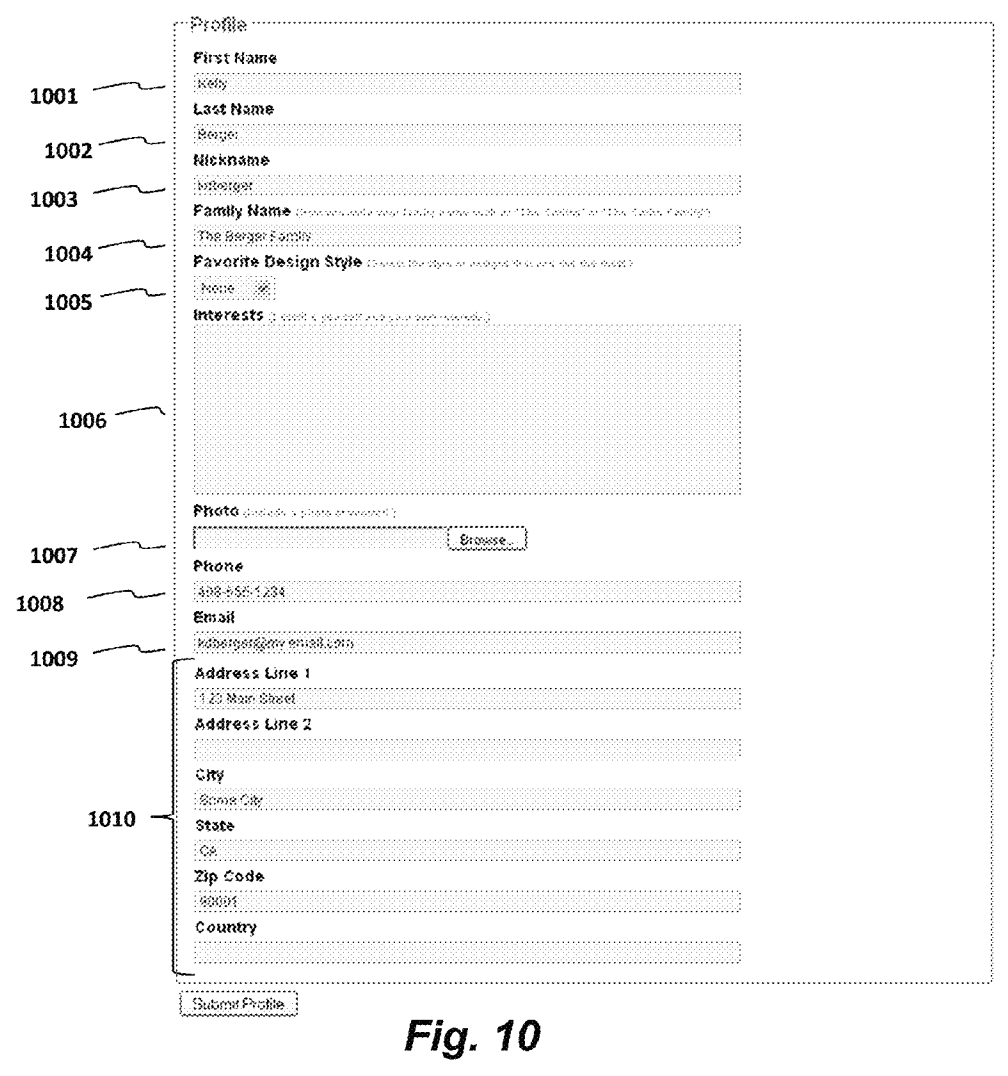

In one embodiment, each user is required to establish an account on the online photo service 100. FIG. 10 illustrates one embodiment of a graphical user interface (GUI) for editing a user profile with data fields for the users first and last name 1001 and 1001, respectively, the user's nickname 1003, the user's family name 1004, the users preferred design style 1005 (e.g., classic, modern, etc), the user's interests 1006, a photo of the user 1007 (including a browse button to locate the photo on a client computer), the user's phone number 1008, email address 1009 and address information 1010. Other members of the user's friends and family may enter similar profile information and may share this information with the end user. Alternatively, or in addition, as mentioned above and in the co-pending applications, the user may store similar information for each of the contacts within the user's contacts database.

Figure 11:
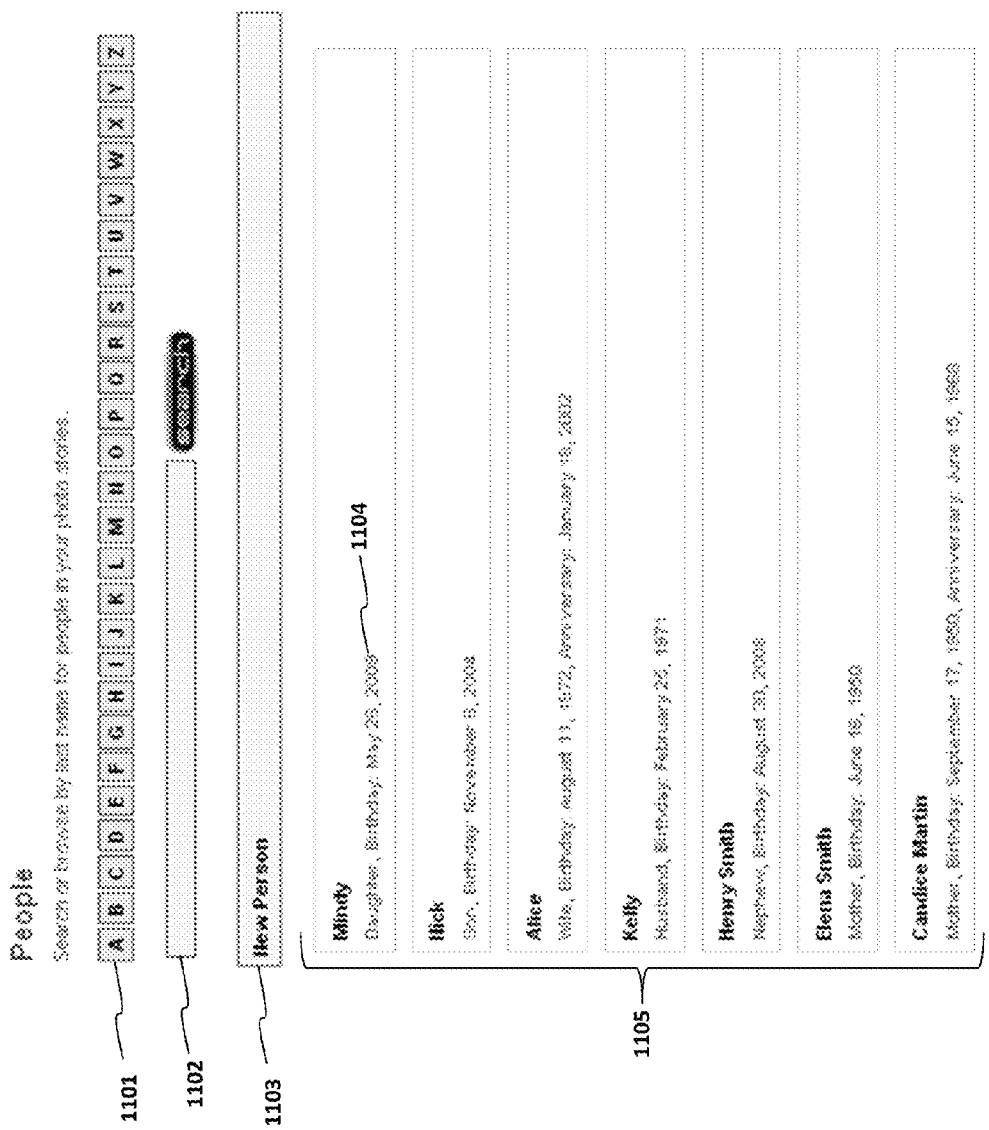
FIG. 11 illustrates a GUI for browsing for people within a photo stories database.

FIG. 11 illustrates one embodiment of a GUI for browsing individuals within the photo stories contacts database 210. A top row of alphabetic characters 1101 allows the user to jump to a certain point within the database corresponding to a selected character. A search field 1102 allows the user to search for specific contacts and a "new person" field allows takes the user to a new person details GUI (such as that shown in FIG. 12). The GUI provides a listing of individuals 1105 in the contacts database, organized alphabetically. Also shown are certain pertinent details 1104 related to the person such as a relationship to the user (e.g., daughter, son) a birthday and/or an anniversary.

FIG. 12 illustrates a "person details" page for creating and/or editing details associated with a particular contact within the photo contacts database 210. A name is specified in field 1201; a nick name in field 1202; a birth date in field 1203; an anniversary date in field 1204; a relationship to the user in field 1205; and one or more tags related to the person in field 1206. Finally, in field 1207, the user may select a photo of the person (e.g., by browsing to a particular folder and selecting a photo). As described above, the photo may be used to identify the person in photos uploaded to the online photo service 100. For example, the facial recognition engine 402 may employ facial recognition techniques to register a facial recognition signature of the person. This signature may subsequently be used by the facial recognition engine 402 to identify the user in uploaded photographs. Finally, a submit button 1208 is provided for saving the person details within the photo contacts database.

Figure 13:
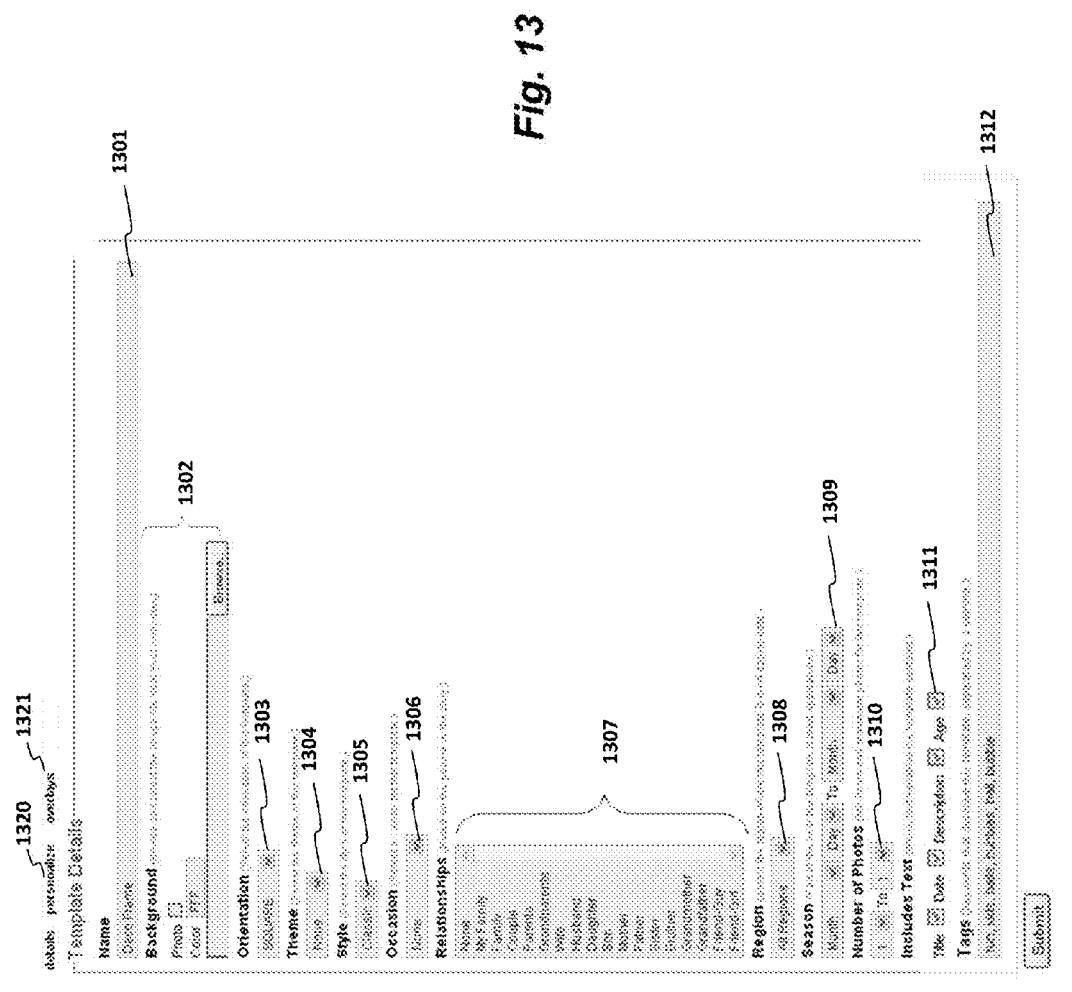

FIG. 13 illustrates one embodiment of GUI for creating and/or editing a photo story template. The GUI includes a personalize link 1320 which, in one embodiment, takes the user to the photo area and text box GUIs illustrated in FIGS. 15 and 16, respectively; and an overlays link 1321 which takes the user to the overlays GUI shown in FIG. 14. The template GUI includes a name field 1301 for entering a template name and a background selection graphic 1302 for either specifying either a color or a picture to be used as a background image for the photo story template. A browse button is provided to browse through folders on the user's computer to select a photo.

An orientation menu 1303 provides options for selecting the photo story size and shape. Examples may include square (e.g., 12"×12", 18"×18", etc), rectangular (e.g., 12"×18", 18"×24", etc), and any other sizes/shapes including both industry standard sizes/shapes and non-standard sizes/shapes. Drop down menu 1304 provides for the selection of a particular theme (e.g., humorous, sentimental, religious, etc); drop-down menu 1305 provides for the selection of a particular style (e.g., modern, classical, whimsy, etc); drop-down menu 1306 provides for the selection of a particular type of occasion (e.g., birthday, anniversary, wedding, Thanksgiving, etc); and selection list 1307 provides options for specifying relationships to be associated with the photo story template (e.g., family, couple, parents, daughter, etc). Drop down menu 1307 provides options for selecting a particular region (e.g., California, San Francisco, New York, Grand Canyon, etc) and month/day drop-down menus 1309 provide for the selection of a particular date range and/or season. Selection boxes 1311 indicate whether text specified in the photo story regions 701-702 described above will be utilized in the photo story design template. The illustrated options include title, date, description and age (of the subjects). Finally, the "tags" data entry field 1312 is used to enter one or more tags to categorize the photo story template (e.g., so that the photo story template may be identified by matching a user's description of the photos in a photo story with the tags).

Figure 14:
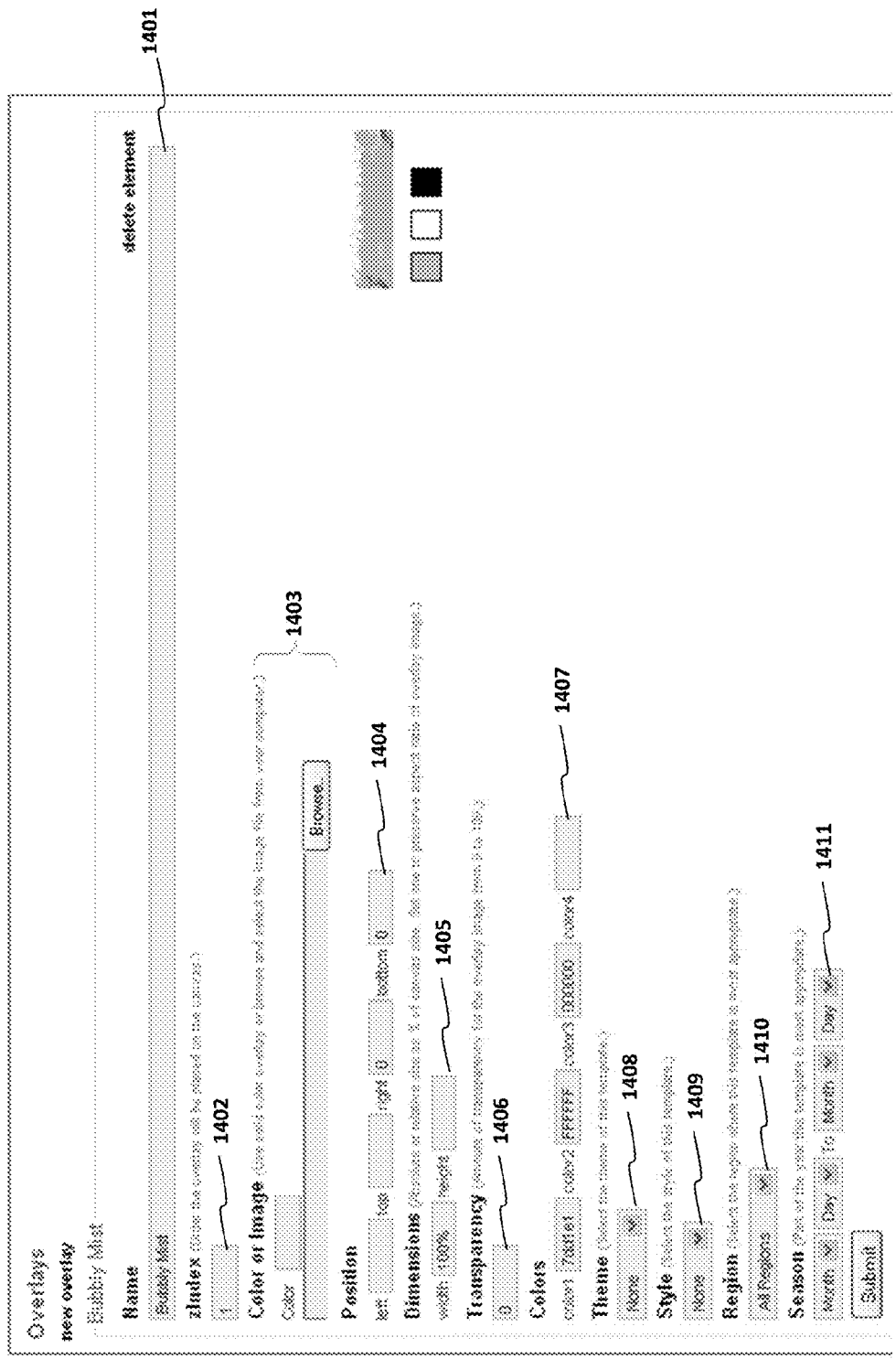
FIG. 14 illustrates one embodiment of a GUI for creating and/or editing a photo story overlay.

In one embodiment, selecting the overlays link 1321 brings a user to the overlays GUI shown in FIG. 14, which allows the user to configure an overlay for the photo story template. In one embodiment, an "overlay" can be used to provide various different graphical features surrounding the pictures of the photo story. Each overlay is comprised of one or more overlay elements. In FIG. 14, a data field is provided for the overlay element name 1401, a zIndex—a value which specifies the order in which the overlay element will be placed on the photo story design canvas. As is known in the art, a zIndex value is a Cascading Style Sheets ("CSS")

property often used in Web page design that sets the stack order of a specific set of elements. An element with larger zIndex is always placed in front of an element with lower stack order. Data entry elements 1403 allow the end user to select a color overlay and/or an image file to be used as an overlay. A browse button is provided to allow the user to search through folders for the image/color file. The position of the overlay within the photo story template is specified in data entry fields 1404. In one embodiment, the position is specified in units such as inches or pixels and defines the boundaries of the overlay (left, top right, bottom). Data entry fields 1405 are used to specify and absolute or relative width and height of the overlay within the photo story template (e.g., as a percentage of the size of the photo story template canvas). In one embodiment, setting only one of these two vales ensures that the aspect ratio will be maintained (i.e., the other will be set automatically while keeping the aspect ratio consistent). In data entry field 1406, the transparency value is set using a value of 0 (not transparent) to 100 (completely transparent). A set of color values are specified in fields 1407. In one embodiment, one or more of the color values are selected based on the main colors used in the photographs of the photo story (as described above). As previously described, the colors in 1407 are in RGB hex format. In one embodiment the colors are replaced by colors in the photos. The default values when the user uploads the overlay image are the main colors from the overlay image, but they can be removed or replaced with values entered by the user. Drop-down menus for selecting a theme; a style 1409; and a region 1410 are provided and month/day drop-down menus 1311 provide for the selection of a particular date range and/or season.

Figure 15:
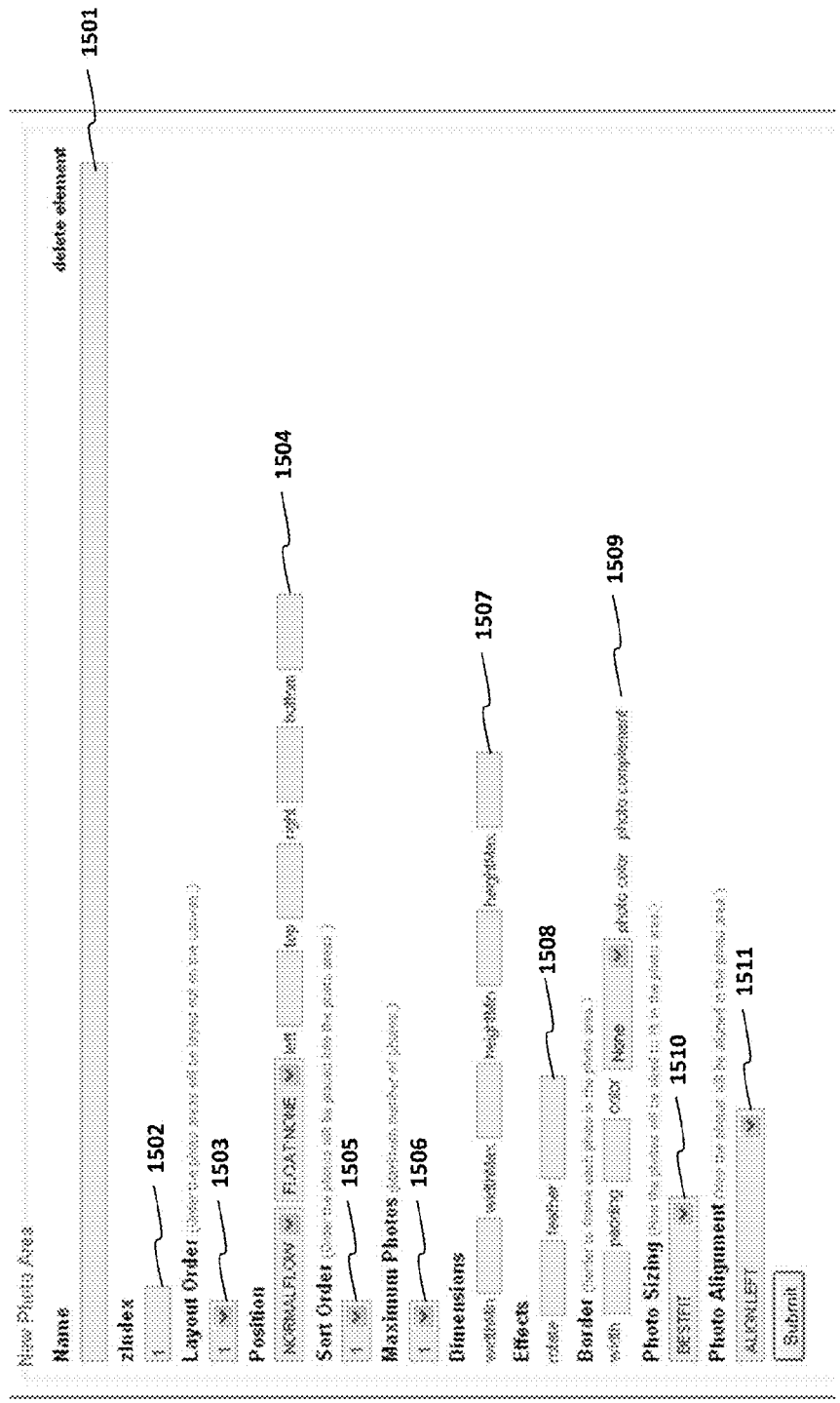
FIG. 15 illustrates one embodiment of a GUI for creating and/or editing a photo story photo area.

As illustrated in FIG. 15, a photo area template includes a data field for a template name 1501 and a zIndex value 1502. As described above, the zIndex value specifies the order in which the photo area is laid out on the photo story canvas in relation to other design elements (e.g., other photo areas, text boxes, overlays, etc). A layout order drop-down menu 1503 specifies the order in which the different photo areas will be laid out on the photo story canvas (e.g., using an integer value). A set of position drop-down menus and data fields 1504 allow the user to specify the position of the photo area. The user may specify position using prearranged selections within the drop-down menus (e.g., float left, float right) and by specifying left, top, right, bottom values as percentages of the width or height of the photo story canvas. The leftmost drop-down menu shown in 1504 provides options for normal flow, absolute and relative. In one embodiment, Normal Flow is the layout flow that starts at top-left and goes to bottom-right, Absolute means absolute coordinates are used, and Relative means offset from the position that the element would be positioned by Normal Flow. In one embodiment, these properties are used in cascading style sheet (CSS) positioning so that one of ordinary skill in the art familiar with CSS would understand how to configure the design. A sort order value selected via a drop-down menu 1505 specifies the order in which the photos will be placed into the photo areas. For example, when there are multiple photos in the photo story, they are sorted with photo number 1 on the left and increasing to the right. The sort order in the photo area specifies in which order the photos will be laid out when there are multiple photo areas in the template. For example, with one photo area with maximum photos set to 1 and sort order 1 and another with maximum photos set to 4 and sort order 2, the first photo in the story will go in the first photo area and the 2 through remaining photos will go in the second photo area.

A maximum photos drop-down menu 1506 allows the user to specify the maximum number of photos for the photo area and a set of data fields 1507 allow the designer to specify minimum and maximum width and height for the photo region. Data fields 1508 are provided for specifying different photo effects such as rotating and feathering (e.g., using a percentage or absolute value) and for setting a border around the photo region 1509 (specifying width, padding amount and color). A photo sizing drop-down 1510 defines how the photos in the photo area will be cropped to fit within the photo area with options including best-fit, uniform width and uniform height and a photo alignment drop-down 1511 defines how the photos are aligned and distributed within the photo area. Values include align-left, align-center, align-right, align-top, align-middle, align-bottom, distribute-horizontally and distribute-vertically. In one embodiment, the foregoing variables are interpreted by the photo story layout engine 403 when determining how to arrange the photos on each photo story.

Figure 16:
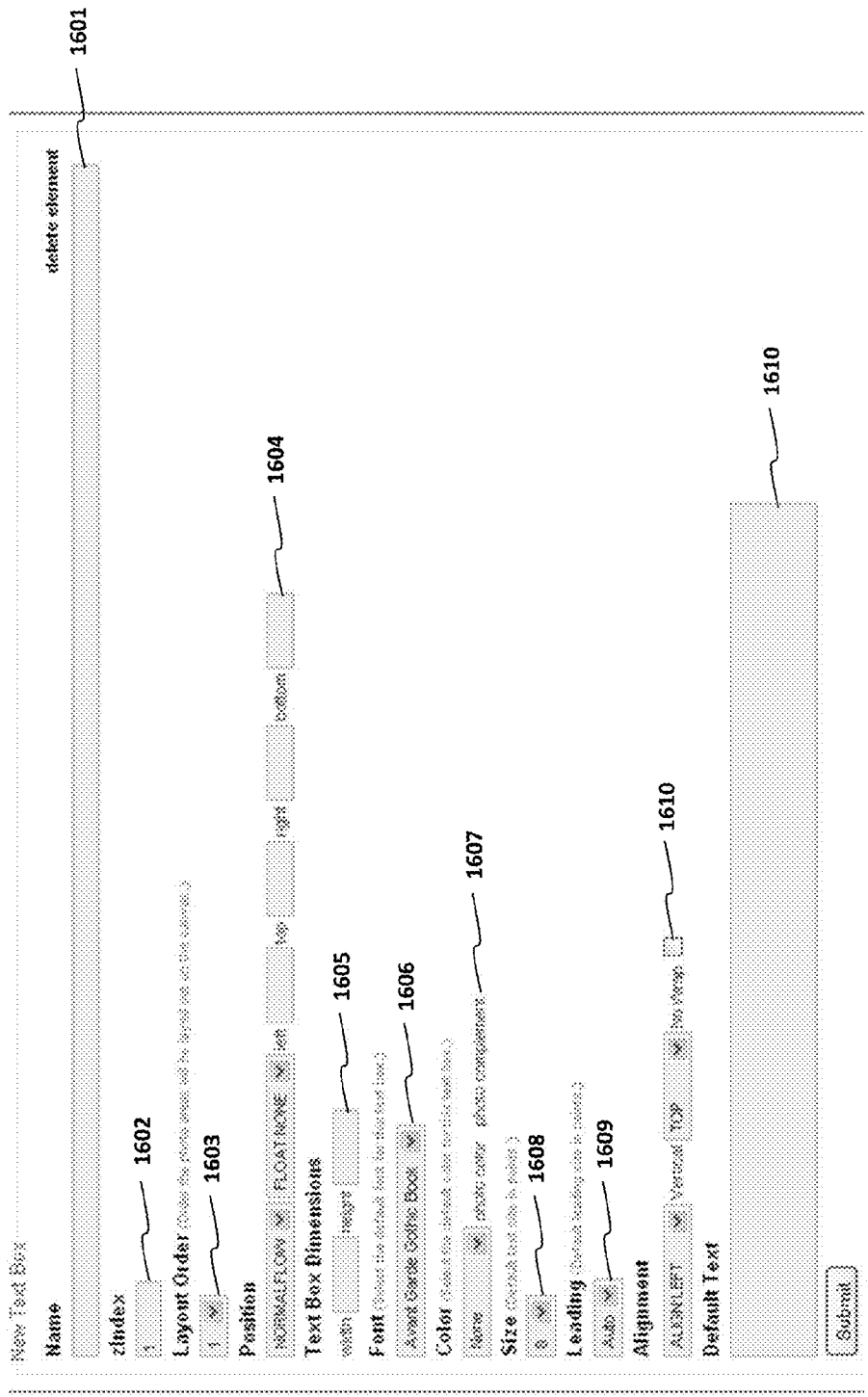
FIG. 16 illustrates one embodiment of a GUI for creating and/or editing a photo story text area.

As illustrated in FIG. 16, a text box template includes data fields for a text box name 1601; a zIndex value 1602; a layout order 1603; a position 1604; and text box dimensions 1605 (specified either as a percentage of the photo story template or using absolute values). Drop-down menus provide options for font type 1606, color 1607, size 1608 and leading 1609 and drop-down menus 1610 allow the user to specify alignment values for the text box. Finally a data entry field 1610 allows a designer to specify default text to be used in the text box. In one embodiment, variables may be used as described above. For example, an AGE variable may be included to specify the age of a particular subject. These variables are automatically populated using information from the user's contacts database (once the subjects in the photos are identified).

The embodiments of the invention described herein may be implemented within the context of any personalized card or stationery products. For example, in one embodiment, an order flow for personalized stationery such as birth announcements or holiday cards is used in which the user will select the photo or photos they would like to use first. The online stationery/card service will then use the same techniques described above to determine the dominant colors in the photos and then suggest card designs that have colors that look great with the colors in the photos. In some cases, the same design is available in many different colors and the service will choose the design color that works best for the colors in the photos. In another case, the some of the design elements in the card could be colored based on the colors in photos (the borders around photos, background of the card, embellishments).

In one embodiment, the different graphical user interface (GUI) features described herein are generated by presentation and session management logic 106 executed on the online stationery service. In one embodiment, various well known functional modules associated within the presentation and session management logic 106 are executed to receive input, process the input, interact with one or more other modules shown in the figures, and dynamically generate Web pages containing the results. The Web pages are then transmitted to the user's client computer 140 and rendered on a browser 145. The Web pages may be formatted according to the HyperText Markup Language ("HTML") or Extensible HTML ("XHTML") formats, and may provide navigation to other Web pages via hypertext links. One embodiment utilizes Dynamic HTML ("DHTML"), a collection of technologies used together to create interactive Web sites by using a combination of a static markup language (e.g., HTML), a client-side scripting language (e.g., JavaScript), a presentation definition language (e.g., CSS), and the Document Object Model ("DOM").

Throughout the discussion above, various details have been omitted to avoid obscuring the pertinent aspects of the invention. For example, in an embodiment of the invention in which the user connects to the online photo service 100 via a Web browser, various well known functional modules associated within the presentation and session management logic 206 shown in the figures are executed to receive input, process the input and dynamically generate Web pages containing the results. The Web pages described herein may be formatted according to the well-known HyperText Markup Language ("HTML") or Extensible HTML ("XHTML") formats, and may provide navigation to other Web pages via hypertext links. One embodiment utilizes Dynamic HTML ("DHTML"), a collection of technologies used together to create interactive Web sites by using a combination of a static markup language (e.g., HTML), a client-side scripting language (e.g., JavaScript), a presentation definition language (e.g., CSS), and the Document Object Model ("DOM"). Of course, the underlying principles of the invention are not limited to any particular set of protocols or standards.

In one embodiment, the Web server used to implement the embodiments of the invention is an Apache web server running on Linux with software programmed in PHP using a MySQL database.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules such as wizards and other logic may be implemented as software, hardware or any combination thereof. Accordingly, the scope and spirit of the invention should be judged in terms of the claims which follow.

What is claimed is:

1. A computer system for creating photo stories, comprising:
   a computer storage configured to store a plurality of photo story design templates characterized by attributes of multiple pages and numbers of photos that the photo story design templates are respectively configured to incorporate across the multiple pages therein; and
   a computer processor configured to obtain a plurality of photos and metadata associated with the photos,
   to analyze the plurality of photos, or the metadata, or a combination thereof by the computer system to produce an analysis result,
   to subdivide the plurality of photos to produce a group of photos based on the analysis result,
   to automatically select a photo story design template from the plurality of photo story design templates based, at least in part, on number of photos in the group of photos to be placed across the multiple pages, and
   to incorporate the group of photos into the photo story design template across the multiple pages to produce a photo story.

2. The computer system of claim 1, wherein the photo story design template is selected based, in part, on the analysis result.

3. The computer system of claim 1, wherein computer processor is configured to automatically determine the number of photos in the group of photos by the computer system.

4. The computer system of claim 1, wherein the attribute specifies a preferred range for the number of photos for a photo story design template.

5. The computer system of claim 4, wherein computer processor is configured to assign a higher weight to a photo story design template if the number of photos in the group of photos falls into the preferred range in the number of photos of the photo story design template.

6. The computer system of claim 1, wherein computer processor is configured to use the analysis result to filter out inappropriate photo story design templates.

7. The computer system of claim 1, wherein computer processor is configured to rank the plurality of photo story design templates based on the analysis result.

8. The computer system of claim 1, wherein the metadata include photo capture time at which a photo is taken, wherein computer processor is configured to extract photo capture times from the metadata associated with the group of photos and to incorporate the group of photos into the photo story design template in a timeline based on the photo capture times.

9. The computer system of claim 1, wherein the metadata include a geographic location at which a photo is taken, wherein computer processor is configured to extract geographic locations from the metadata associated with the group of photos, and incorporate the group of photos into the photo story design template at least in part based on the geographic locations associated with the first group of photos.

10. The computer system of claim 1, wherein computer processor is configured to
    analyze faces of people in the group of photos,
    generate facial signatures to uniquely identify the faces of the people in the group of photos, and
    incorporate the group of photos into the photo story design template at least in part based on the facial signatures identifying the faces in the group of photos.

11. The computer system of claim 1, wherein the metadata include a relationship between people, wherein computer processor is configured to extract the relationship from the metadata associated with the group of photos, and to incorporate the group of photos into the photo story design template at least in part based on the relationship between people.

12. The computer system of claim 1, wherein the metadata include an occasion during which the photos were taken, wherein computer processor is configured to
- extract the occasion from the metadata associated with the group of photos; and
- incorporate the group of photos into the photo story design template at least in part based on the occasion associated with the group of photos.

13. The computer system of claim 12, wherein the occasion includes a birthday, an anniversary, or a holiday.

14. The computer system of claim 1, wherein computer processor is configured to
- determine an occasion associated with some of the group of photos based on a birth date or an anniversary date, and
- incorporate the group of photos into the photo story design template at least in part based on the occasion associated with the group of photos.

15. The computer system of claim 1, wherein computer processor is configured to
- determine a subject associated with the group of the photos, and
- incorporate the group of photos into the photo story design template at least in part based on the subject associated with the group of photos.

16. The computer system of claim 1, wherein at least some of the metadata are input by a user.

17. The computer system of claim 1, wherein at least some of the photos obtained by the computer system are transferred from a social networking site.

18. The computer system of claim 1, wherein the photos obtained by the computer system are uploaded from one or more users via a computer network.

19. The computer system of claim 1, further comprising:
- a printing facility configured to manufacture a photo book based on the first photo story.

20. The computer system of claim 1, wherein computer processor is configured to allow the first photo story to be shared online.

* * * * *